United States Patent [19]

Wilber et al.

[11] Patent Number: 4,897,880

[45] Date of Patent: Jan. 30, 1990

[54] DATA ACQUISITION CONTROL METHOD AND SYSTEM FOR A HAND HELD READER

[75] Inventors: Scott A. Wilber; David Joffe; Brian Van Duzee, all of Boulder; Mark Haas, Lafayette; Andrew Goldstein, Boulder; Chris M. Wieland, Longmont, all of Colo.

[73] Assignee: Soricon Corporation, Boulder, Colo.

[21] Appl. No.: 319,930

[22] Filed: Mar. 6, 1989

Related U.S. Application Data

[63] Continuation of Ser. No. 15,220, Feb. 17, 1987, abandoned.

[51] Int. Cl.⁴ .............................................. G06K 9/00
[52] U.S. Cl. .......................................... 382/13; 382/9; 382/48
[58] Field of Search ................... 382/9, 10, 13, 16, 30, 382/34, 48, 59; 235/454, 461, 485

[56] References Cited

U.S. PATENT DOCUMENTS

| | | | |
|---|---|---|---|
| 3,399,275 | 8/1968 | Niertit et al. | 179/1 |
| 3,582,888 | 6/1971 | Abuls | 340/146.3 |
| 3,586,772 | 6/1971 | Hardin | 178/7.1 |
| 3,735,350 | 5/1973 | Lemelson | 340/146.3 SY |
| 3,747,066 | 7/1973 | Vernot et al. | 340/146.3 AG |
| 3,772,648 | 11/1973 | Schlang | 340/146.3 J |
| 3,784,982 | 1/1974 | Schlang | 340/146.3 J |
| 3,868,636 | 2/1975 | Schlang | 340/146.3 J |
| 3,873,972 | 3/1975 | Levine | 340/146.3 AC |
| 3,918,029 | 11/1975 | Lemelson | 340/146.3 SY |
| 3,947,817 | 3/1976 | Requa, deceased et al. | 340/146.3 MA |
| 3,967,243 | 6/1976 | Kawa | 382/46 |
| 3,969,700 | 7/1976 | Bollinger et al. | 340/146.3 WD |
| 3,982,227 | 9/1976 | Joynson et al. | 340/146.3 AE |
| 3,988,715 | 10/1976 | Mullan et al. | 340/146.3 S |
| 4,003,021 | 1/1977 | Sasaki et al. | 382/53 |
| 4,005,385 | 1/1977 | Joynson et al. | 340/146.3 AE |
| 4,047,158 | 9/1977 | Jennings | 364/900 |
| 4,105,997 | 8/1978 | McGinn | 340/146.3 ED |
| 4,193,056 | 3/1980 | Morita et al. | 340/146.3 AC |
| 4,260,880 | 4/1981 | Thomas | 235/454 |
| 4,277,689 | 7/1981 | Thomas et al. | 250/567 |
| 4,317,109 | 2/1982 | Odaka et al. | 382/13 |
| 4,319,418 | 3/1982 | Transport | 40/124.1 |
| 4,326,258 | 4/1982 | de la Guardia | 364/515 |
| 4,329,717 | 5/1982 | Logie et al. | 358/282 |
| 4,342,050 | 7/1982 | Traino | 358/256 |
| 4,345,314 | 8/1982 | Melamud et al. | 364/515 |
| 4,351,004 | 9/1982 | Choate et al. | 358/213 |
| 4,367,457 | 1/1983 | Tadauchi et al. | 340/347 AD |
| 4,369,333 | 1/1983 | Gemperle et al. | 178/22.13 |
| 4,369,471 | 1/1983 | Hirata | 358/280 |
| 4,377,741 | 3/1983 | Brekka et al. | 235/472 |
| 4,377,802 | 3/1983 | Ferenc | 340/84 |
| 4,377,803 | 3/1983 | Lotspiech et al. | 382/9 |
| 4,379,283 | 4/1983 | Ito et al. | 382/18 |
| 4,379,824 | 4/1983 | Bailey | 382/9 |
| 4,383,275 | 5/1983 | Sasaki et al. | 358/280 |
| 4,385,322 | 5/1983 | Hubach et al. | 358/221 |
| 4,387,298 | 6/1983 | Petersen et al. | 235/462 |

(List continued on next page.)

FOREIGN PATENT DOCUMENTS

| | | |
|---|---|---|
| 0114305 | 8/1984 | European Pat. Off. ............. 382/13 |
| 2098348 | 3/1981 | United Kingdom . |
| 2157873 | 4/1984 | United Kingdom . |

OTHER PUBLICATIONS

Kreyszig, Advanced Engineering Mathematics, 1983, pp. 345-355, 822-829.

*Primary Examiner*—Leo H. Boudreau
*Assistant Examiner*—Jose L. Couso
*Attorney, Agent, or Firm*—Rosen, Dainow & Jacobs

[57] ABSTRACT

A data acquisition control method and system for alphanumeric character recognition. An unknown pattern is normalized, the normalized pattern is then divided into top and bottom parts. A center of mass is calculated for the two parts and is utilized for vertically aligning the unknown pattern. The vertically aligned pattern is width normalized and feature vectors are obtained. The feature vectors of the unknown pattern are then compared with feature vectors of known patterns stored in memory and the characters are identified.

3 Claims, 28 Drawing Sheets

U.S. PATENT DOCUMENTS

| | | | |
|---|---|---|---|
| 4,399,275 | 5/1983 | Sasaki | 358/282 |
| 4,399,469 | 8/1983 | Lew | 358/282 |
| 4,402,013 | 8/1983 | Wargo | 358/160 |
| 4,408,342 | 10/1983 | Grabowski et al. | 382/62 |
| 4,410,916 | 10/1983 | Pratt et al. | 358/263 |
| 4,411,015 | 10/1983 | Scherl et al. | 382/51 |
| 4,414,582 | 11/1983 | Ogasawara | 358/282 |
| 4,426,731 | 1/1984 | Edlund et al. | 382/56 |
| 4,434,475 | 2/1984 | McCaskill et al. | 364/900 |
| 4,435,777 | 3/1984 | McCaskill et al. | 364/900 |
| 4,435,778 | 3/1984 | Cason et al. | 364/900 |
| 4,439,789 | 3/1984 | Cahill | 358/256 |
| 4,453,268 | 6/1984 | Britt | 382/50 |
| 4,468,088 | 8/1984 | Mori et al. | 382/20 |
| 4,499,595 | 2/1985 | Masaitis et al. | 382/9 |
| 4,527,283 | 7/1985 | Ito et al. | 382/9 |
| 4,553,035 | 11/1985 | Malinsky et al. | 250/566 |
| 4,573,199 | 2/1986 | Chen et al. | 340/731 |
| 4,610,025 | 9/1986 | Blum et al. | 382/9 |
| 4,636,511 | 1/1987 | Shippey | 354/402 |
| 4,701,961 | 10/1987 | Hongo | 382/47 |

CALCULATION OF THE
THRESHOLD VALUE

STEPS TO DETERMINE
IF dVAVG CAN BE ADJUSTED $*dVAVG = dVAVG - \frac{dVAVG}{16} + \frac{dVAVG}{16}$

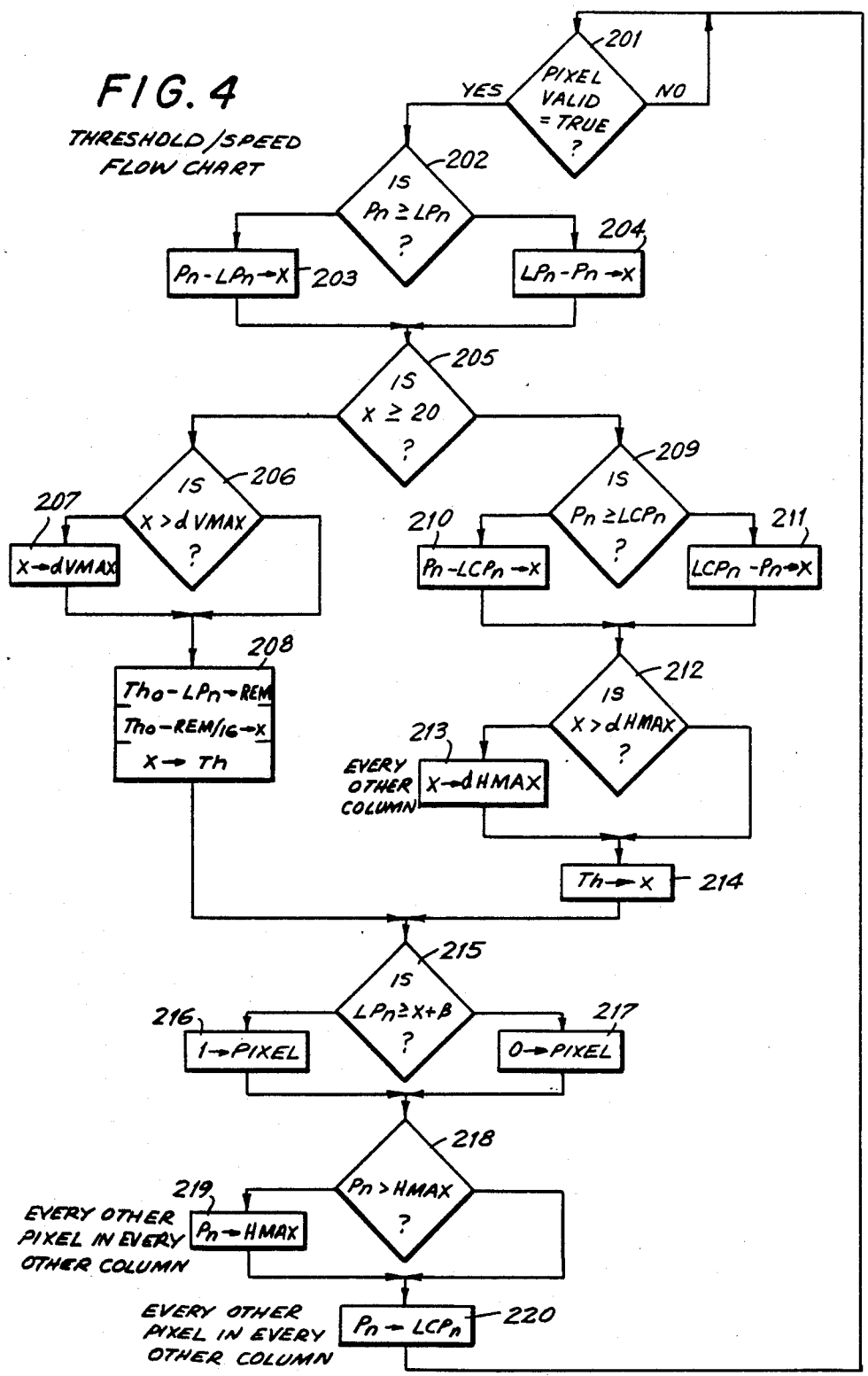

FIG. 18
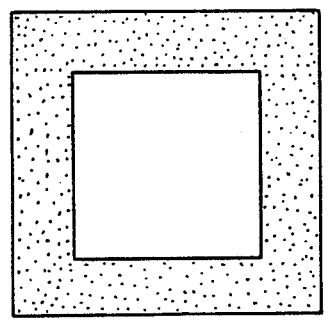
ORIGINAL
CHARACTER
FIG. 19
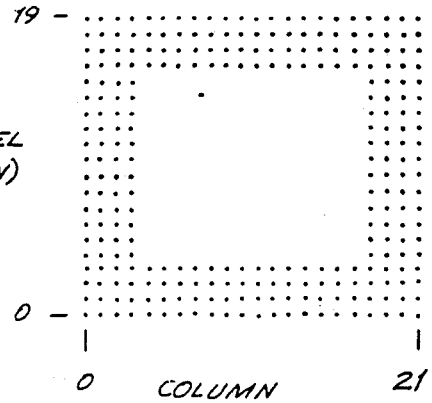
BIT IMAGE
CHARACTER
(INPUT TO
CHARACTER
SEPARATION)
FIG. 20
```
              19 19 19 19 19 19 19 19 19 19 19 19 19 19
              16 16 16 16 16 16 16 16 16 16 16 16 16 16
19 19 19 19 3  3  3  3  3  3  3  3  3  3  3  3  3  3 19 19 19 19
 0  0  0  0 0  0  0  0  0  0  0  0  0  0  0  0  0  0  0  0  0  0
```
|——————————————————————————————————|
0           COLUMN                21
RUN LENGTH (INTEGER)
REPRESENTATION
OF CHARACTER
(CHARACTER SEPARATION
INTERVAL REPRESENTATION)

FIG. 24 MASTER STATE MACHINE

DATA ACQUISITION CONTROL METHOD AND SYSTEM FOR A HAND HELD READER

This application is a continuation of U.S. application Ser. No. 07/015,220, now abandoned, filed 2-17-87.

BACKGROUND OF THE INVENTION

1. Field of the Invention

The present invention relates to a data acquisition control method and system. The invention is particularly adaptable to optical recognition systems which employ techniques for processing a wide range of inputted images or patterns for recognition. The system of the invention may be portable, i.e. having at least a hand movable wand or the like adapted to be moved or scanned along one or more lines of print, type, etc. It will of course be apparent that many features of the invention are also adapted to recognition devices other than movable, hand held or optical and it is hence not intended to be so limited in many of its aspects.

2. Description of the Prior Art

The need for and popularity of optical image or pattern recognition systems has recently grown enormously due to the tremendous popularity of word processing systems which may employ an optical character reader to input data into the system. In these applications it has been traditional to employ large mechanical structures for controlling the device that actually scans the characters and converts the optical data into an electrical signal. These scanning structures automatically control the alignment of the sheet being read with the scanning head and also the speed at which the device scans.

The size and complexity of such automatic mechanical scanning structures render them inappropriate for numerous applications in which portability or selectivity is desirable. To enhance portability, those working in this field have attempted to eliminate the necessity for the large mechanical scanning structure. Thus, U.S. Pat. No. 3,991,299, Chadima, Jr., et al. discloses a bar code scanner in which a pen-shaped instrument is drawn across the bar code in order to read it.

Others have attempted to develop hand-held readers for codes other than bar codes. U.S. Pat. No. 4,377,741, Brekka et al. discloses a hand-held optical code reader. However, when advancing from relatively simple bar code readers to more general character scanners, problems arise for example with respect to alignment of the scanning head with respect to the characters an the speed with which the scanning head proceeds over the characters. Lacking the mechanical structure for controlling these variables, a portable unit must employ alternative solutions to minimize problems associated with misalignment, skewing, variations in scanning speed, and indistinct spacing.

U.S. Pat. Nos. 3,918,029 and 3,735,350, both to Lemelson, teach a scanning system which provides a solution to the alignment or skew problem. A guide is provided for directing a scanning element across a row of characters. Thus, prior to scanning, the characters are aligned with the guide. Then, it becomes fairly simple to maintain alignment of the scanning head with the row of characters by sliding the head along the guide. However, even in these patents, a mechanical guide is required, and codes and not characters are being scanned. A further problem occurs that although skewing errors have been removed, it is still necessary to recognize the scanned characters. If the speed of scanning varies or even is different from a preestablished ideal speed. The proportions of characters that have been read and converted into electrical signals will vary, thus rendering the problem of recognition extremely difficult.

U.S. Pat. No. 3,947,817, Requa, which discloses a portable, hand-held optical code reader, mentions the problem that variations in scanning speed, producing expansions and contractions of data, render recognition difficult. However, the solution suggested by Requa involves complex data processing. Other code reading and character recognition devices are disclosed, for example, in U.S. Pat. No. 3,747,066, Vernot and U.S. Pat. No. 3,873,972, Levine.

SUMMARY OF THE INVENTION

Common to both hand-held and mechanical optical scanning is the problem of image recognition. Among the many difficulties that image scanning systems must overcome, for example when optical scanning is employed, are variations in lighting, variation in contrast between characters and background, recognition of different font designs, discrimination of kerns.

Hand-held scanning compounds these not insignificant problems with additional challenges. Unlike mechanical scanning during hand-held scanning the scanner does not traverse the paper in a uniform manner. These variations create a "distorted" pattern of the scanned characters. One principal source of distortion is the variable speed at which the scanner traverses the paper.

Another distortion can be termed "shearing". Shearing distortion is created by variations in the vertical position of the scanner as it traverses a horizontal character line.

In addition, the angle between the scanner and the character line will not normally be known or remain constant. This creates a third distortion termed "skewing".

As noted above, prior art devices have recognized some of the foregoing problems. However, no one prior art device has solved this plethora of problems satisfactorily. Moreover, often prior art solutions involve commercially unacceptable compromises. For example, the processing required to correct the various distortion may be so complex and time consuming that the hardware required to provide an acceptable scanning speed renders a usable scanner unacceptably expensive. On the other hand, a more modest hardware implementation results in a scanning speed that causes other forms of information input to be more expedient or economically preferable.

Prior devices and methods have additionally been directed primary, if not solely, to the recognition of conventional "characters", such as alphanumeric characters, and bar codes ultimately representing alphanumeric characters. The technology has not in general given consideration to the use of reading devices, such as optical reading devices, for treating other image data, such as but not limited to graphic image data, in a similar manner for the recognition of conditions by comparison with a data base.

It is accordingly an object of this invention to provide a data acquisition and control method and system that overcomes the above disadvantages of known methods and systems.

It is a further object of the invention to provide a data acquisition and control method and system adaptable to receiving image data from optical as well as other devices, and processing such data for the identification of patterns, characters, etc, by comparison with a data base, that overcomes the above disadvantages of known methods and systems.

It is still another object of the present invention to provide a hand-held image character scanner which reliably produces unique patterns for a variety of character fonts.

It is another object of the present invention to provide an optical image scanner that automatically corrects for variations in illuminating light intensity.

It is another object of the present invention to provide an image scanner that automatically corrects for varying contrast between the character and its background.

It is another object of the present invention to provide an image scanner that can recognize a variety of character fonts and pitches.

It is another object of the present invention to provide an image scanner that can distinguish between adjacent characters where kerning is present.

It is another object of the present invention to provide an image scanner that corrects for scanning at a nonuniform speed.

It is another object of the present invention to provide an image scanner that compensates for non-linear scanning.

It is another object of the present invention to provide an image scanner that compensates for scanning at an angle to the character line.

It is another object of the present invention to provide an image scanner that provides for the above objects while scanning at a relatively high rate.

It is another object of the present invention to provide an image scanner that provides for the above objects in a relatively inexpensive implementation.

Briefly stated, in accordance with one feature of the invention, an apparatus for image recognition is provided comprising means for producing first signals corresponding to the image of a character which may include a pattern to be identified, means for standardizing said first signals to produce second signals therefrom. The standardizing means comprises means for modifying said first signals to represent a modified means for storing third signals corresponding to at least one characteristic of a plurality of different characters whereby the second signals represent said pattern modified in a predetermined manner are provided for comparing said second and third signals to identify said first mentioned character. The means producing first signals may comprise means for producing said first signals to correspond to a matrix of column and row elements representing said image of said character to be recognized.

The term "standardizing", as used herein, refers to the modification of signals by the performing of predetermined steps so that the signals correspond to a modified character. (The "modified" character may not necessarily be "recognizable" as such in the sense of having an appearance similar to that of the actual character.)

The means for generating said second signals may comprise means for generating a plurality of signals representing said matrix with different relative shifting of the column elements, and means selecting a determined one of said plurality of signals as said second signals in accordance with a determined algorithm. The means for selecting may comprise means for generating signals representing a horizontal histogram from each of said plurality of signals, and means for selecting that one of said plurality of signals whose histogram has a determined characteristic.

The means for producing second signals may comprise means for generating a plurality of signals representing said matrix with different relative shifting of the row elements thereof, and means for selecting a determined one of said plurality of signals as said second signals in accordance with a determined algorithm. Alternatively the means for producing second signals may comprise means for generating said second signals to represent an image in which the columns have been shifted relative to one another with the bottoms thereof defining a straight line. In this arrangement the straight line may also be employed to enable alignment of a plurality of characters.

The means for producing second signals may alternatively or additionally comprise means for expanding said image in the column and row direction until the image touches the borders of a matrix of determined dimension, said second signals corresponding to said expanded image, as well as means for determining the centers of mass of determined portions of said matrix, means for aligning said centers of mass, and means for generating signals corresponding to the shift of the rows of said matrix as said second signals.

The means for producing said second signals may further alternatively or additionally comprise means for generating signals corresponding to the density of character elements in each of a plurality of separate portions of said matrix.

Still further, the means for producing said second signals may alternatively or additionally comprise means for generating said second signals as a function of the distribution of character elements in the rows of said matrix. The means for producing said second signals may alternatively comprise means for generating said second signals as a function of the distribution of character elements in the column of said matrix.

In accordance with a method of character recognition in accordance with the invention, the method comprises producing first signals corresponding to the image of a character to be identified, standardizing said first signals by modifying said first signals to produce second signals representing a modified character, providing third signals corresponding to at least one characteristic of a plurality of different characters, and then comparing at least one characteristic of said second signals with said third signals to identify said first mentioned character.

The step of producing said first signals may comprise producing signals to correspond to a matrix of column and row elements representing said image of said character to be recognized. The step of producing second signals may comprise generating a plurality of signals representing said matrix with different relative shifting of the column elements thereof, and selecting a determined one of said plurality of signals as said second signals in accordance with a determined algorithm. The step of selecting may comprise generating signals representing a horizontal histogram from each of said plurality of signals, and selecting that one of said plurality of signals whose histogram has a determined characteristic.

The step of producing second signals may comprise generating a plurality of signals representing said matrix with different relative shifting of the row elements thereof, and selecting a determined one of said plurality of signals as said second signals in accordance with a determined algorithm. The step of producing second signals may comprise generating said second signals to represent an image in which the columns have been shifted relative to one another with the bottoms thereof defining a straight line. The method may further comprise generating first signals corresponding to the images of additional characters to be recognized, said step of producing second signals comprising generating said second signals to represent images in which the columns have been shifted relative to one another with this bottoms thereof corresponding to said first mentioned and additional characters defining a straight line The step of producing second signals may still further comprise expanding said image in the column and row direction until the image touches the borders of a matrix of determined dimension, said second signals corresponding to said expanded image. In addition, the centers of mass of determined portions of said matrix may be determined, followed by aligning said centers of mass, and generating signals corresponding to the shift of the rows of said matrix as said second signals.

The method step of producing said second signals may further comprise generating signals corresponding to the density of character elements in each of a plurality of separate portions of said matrix. Alternatively the step of producing said second signals may comprise generating said second signals as a function of the distribution of character elements in the rows of said matrix or generating said second signals as a function of the distribution of character elements in the column of said matrix.

In accordance with a further feature of the invention, a character recognition system comprises a manually movable wand having sensing means responsive to information imprinted on a substrate. The wand comprises a column of a plurality of sensing elements, means for repetitively sequentially scanning said elements to produce sequential groups of signals with each group of signals comprising a plurality of signals each corresponding to the output of a separate sensing element during the respective scan of said elements. A logic circuit is coupled to receive the outputs of said elements whereby data corresponding to the amplitudes of outputs of said columns of elements at sequentially occurring times are sequentially received by said logic circuit means. The logic circuit comprises means coupled to said receiving means for determining the ratio of the maximum difference of signal outputs of common elements at two adjacent groups of elements to the maximum difference in signal outputs of adjacent elements of one of said groups. Processing circuit means are provided, as well as means for applying said outputs of said elements to said processing circuit means. The applying means comprises means controlling the application of data corresponding to determined ones of said groups of signals to said processing means as a function of said ratio whereby the signals applied to said processing means are substantially independent of speed of movement of said wand.

In accordance with a further feature of the invention, an optical character recognition system comprises a source of data signals representing a two dimensional matrix of elements of at least one character, the matrix defining a plurality of columns representing character elements extending in one direction with respect to said character and rows representing character elements extending in a direction normal to said one direction with respect to said character. The system comprises means for generating from said signals a plurality of modified signals corresponding to characters having adjacent columns relatively displaced to different extents, and means for analyzing said modified signals to select signals corresponding to a character having less shear distortion than the characters represented by the other signals.

Still further in accordance with the invention, an optical character recognition system comprises a source of data signals representing a two dimensional matrix of elements of a plurality of characters, the matrix defining a plurality of columns representing character elements extending in one direction with respect to said characters and rows representing character elements extending in a direction normal to said one direction with respect to said characters, said system comprising means for separating data corresponding to separate characters, said separating means comprising means for detecting runs of character elements in the column direction, means for detecting overlap of column direction runs in adjacent columns, and means responsive to absence of overlap between columns direction runs in adjacent columns for indication character separation.

In accordance with a further feature, an optical character recognition system comprises a source of data signals representing a two dimensional matrix of elements of a plurality of characters, the matrix defining a plurality of columns representing character elements extending in one direction with respect to said characters and rows representing character elements extending in a direction normal to said one direction with respect to said characters, said system comprising means responsive to said data signals for generating modified data signals corresponding to characters in horizontal alignment.

The invention further comprises an optical character recognition system comprising a source of data signals representing a two dimensional matrix of elements of a character, the matrix defining a plurality of columns representing character elements extending in one direction with respect to said character and rows representing character elements extending in a direction normal to said one direction with respect to said character, said system comprising means responsive to said data signals for determining the centers of mass of upper and lower portions of said data, and means deriving modified data signals representing characters with a line joining the derived centers of mass extending directly in said column direction and the rows of data being shifted proportionately relative to said line with respect to the vertical position of the row. The arrangement may further comprises means for modifying said data signals to represent a character having a determined number of rows, means for modifying said data signals to represent a character having a determined number of columns, and/or means for generating a skew index vector for identifying said character, said skew index vector comprising a plurality of words, each word corresponding to the extent of shift of a separate row required to align said centers of mass in said column direction.

The optical character recognition system of the invention may comprise a source of data signals representing a two dimensional matrix of elements of at least one character, the matrix defining a plurality of columns representing character elements extending in one direction with respect to said character and rows representing character elements extending in a direction normal to said one direction with respect to said character, said system comprising means deriving a row index vector identifying said character, said row index vector comprising a plurality of words representing the distribution of character elements in different rows of said matrix.

In accordance with a further feature, the system may comprise a source of data signals representing a two dimensional matrix of elements of at least one character, the matrix defining a plurality of columns representing character elements extending in one direction with respect to said character and rows representing character elements extending in a direction normal to said one direction with respect to said character, said system comprising means deriving a column index vector identifying said character, said column row index vector comprising a plurality of words representing the distribution of character elements in different columns of said matrix.

The optical character recognition system may still further comprise a source of data signals representing a two dimensional matrix of elements of at least one character, the matrix defining a plurality of columns representing character elements extending in one direction with respect to said character and rows representing character elements extending in a direction normal to said one direction with respect to said character, said system comprising means deriving a feature vector identifying said character, said deriving means comprising means for producing a feature vector of a plurality of words, each word corresponding to the number of character elements that exist in a separate block which is an element of a set of defined regions of said character.

The optical character recognition system may comprise a source of first data signals representing a two dimensional matrix of elements of a first character, a source of signals representing two dimensional matrices of a plurality of different known characters, the matrices defining a plurality of columns representing character elements of the respective characters extending in one direction with respect to said characters and rows representing character elements of the respective characters extending in a direction normal to said one direction with respect to said characters, means generating first vectors from the respective data signals for each character, said first vectors being each comprised of a plurality of words each of which defines the character element content of a given separate region of the respective character, means for deriving a plurality of Eigen scores from the respective first vector, the number of Eigen scores derived for each first vector being at least six and less that the number of words of the respective first vector, and means comparing the derived Eigen scores of the first character with the derived Eigen scores of the known characters to identify said first character. The comparing means comprises means for setting a first fixed threshold and a second variable threshold responsive to the average of differences between said Eigen scores, and selection means for selecting only known characters corresponding to differences less than said first and second thresholds. The means for generating at least one additional vector defining the respective first and known characters, and means for comparing said additional vectors of said selected characters for identifying said first character.

The character recognition system of the invention may comprise a sensing device having sensing means responsive to information imprinted on a substrate, said sensing device comprising a column of a plurality of sensing elements, logic circuit means coupled to receive the outputs of said elements whereby data corresponding to the amplitudes of outputs of said columns of elements at sequentially occurring times are sequentially received by said logic circuit means, said logic circuit means comprising means coupled to said receiving means for determining the ratio of the maximum difference of signal outputs of common elements at two adjacent sequentially occurring times to the maximum difference in signal outputs of adjacent elements at the latter of said two adjacent times, processing circuit means, and means for applying said outputs of said elements to said processing circuit means, said applying means comprising means responsive to said ratio for inhibiting the application of data corresponding to the output of said elements at determined ones of said sequentially occurring times whereby the signals applied to said processing means are substantially independent of speed of movement of said wand.

In a further feature of the invention, a character recognition system is provided comprising a movable sensor having sensing means responsive to information imprinted on a substrate, said sensor comprising a column of a plurality of sensing elements, logic circuit means coupled to receive the outputs of said elements whereby data corresponding to the amplitudes of outputs of said columns of elements at sequentially occurring times are sequentially received by said logic circuit means, said logic circuit means comprising means coupled to said receiving means for determining the ratio of the maximum difference of signal outputs of common elements at two adjacent sequentially occurring times to the maximum difference in signal outputs of adjacent elements at the latter of said two adjacent times, processing circuit means, and means for applying said outputs of said elements to said processing circuit means, said applying means comprising means responsive to said ratio for replicating the application of data corresponding to the output of said elements at determined ones of said sequentially occurring times whereby the signals applied to said processing means are substantially independent of speed of movement of said wand.

The character recognition system may comprise a movable sensor having sensing means responsive to information imprinted on a substrate, said sensor comprising a column of a plurality of sensing elements, logic circuit means coupled to receive the outputs of said elements whereby data corresponding to the amplitudes of outputs of said columns of elements at sequentially occurring times are sequentially received by said logic circuit means, said logic circuit means comprising means coupled to said receiving means for determining a threshold value Th at the reception of a signal from a given sensing element in accordance with the relationship:

$$Th = \frac{15}{16} Tho + \frac{1}{16} LPn + K$$

calculation only performed if the absolute value of Pn-LPn is greater than K (during a transition) wherein Tho is the threshold value calculated by the same relationship for the signal from an element adjacent said given element, Pn is the amplitude of signal received from said given element, LPn is the amplitude of signal received from said adjacent element and K is a constant, processing circuit means, and means for applying said outputs of said elements to said processing circuit means, said applying means comprising means for applying only data corresponding to signal amplitudes that exceed said threshold for the given signal to said processing means.

In the above summary of the invention, emphasis has been placed upon the method and system of the invention as applied to an optical system especially adapted to the recognition of alphanumeric characters. While this may constitute the primary use and configuration of systems in accordance with the invention, at least at the present time, it must be stressed herein that the invention is in fact not so limited. Thus, the invention may alternatively or in addition be employed to recognize patterns in non-alphanumerically oriented graphic images as well as to on-line input devices. As an example, it may be employed to recognize the characteristics of patterns in line images, such as electrocardiographs, speech recordings, etc, as well as to patterns in on-line signals such as may be received, for example, from a microphone converting speech to speech signals or other device converting information to signals.

BRIEF FIGURE DESCRIPTION

In order that the invention may be more clearly understood it will now be disclosed in greater detail with reference to the accompanying drawings, wherein:

FIG. 4 is a flow diagram of a portion of the threshold and speed determining method of the invention, as effected in the hardware of the system;

Figure 5:
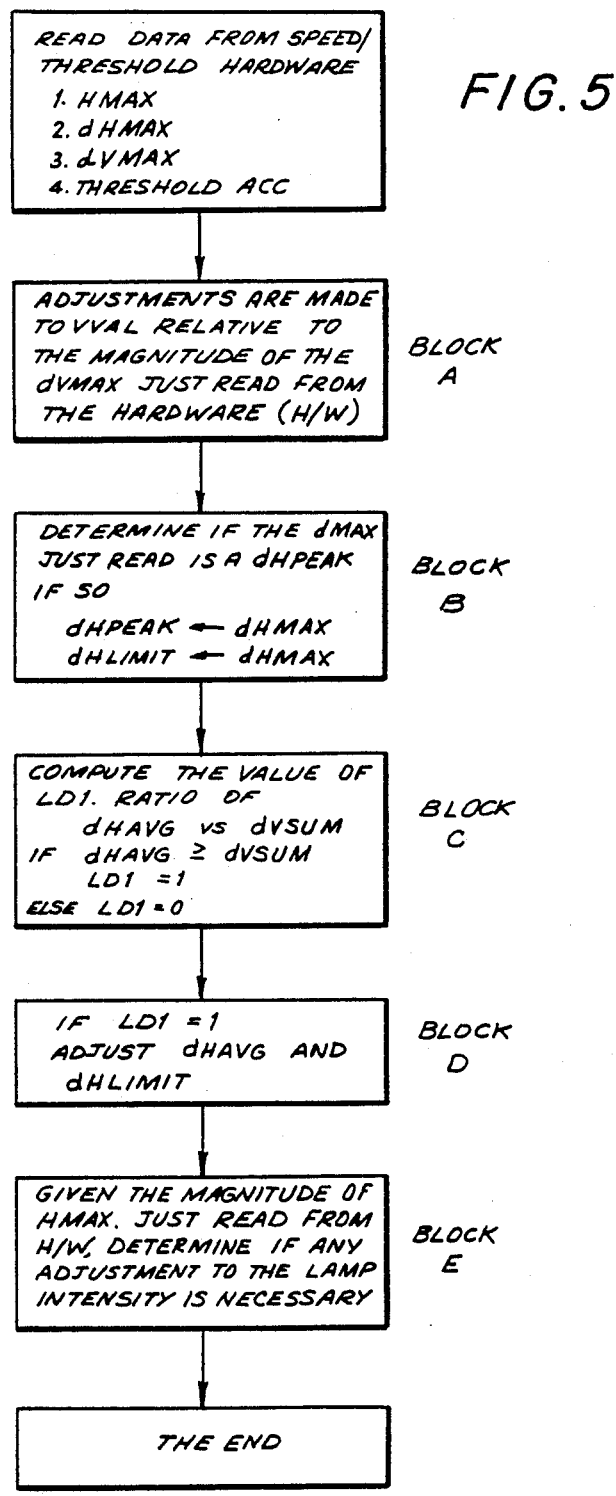
FIG. 5 is a flow diagram of a further portion of the threshold and speed determining method of the invention, as effected by software.
Figure 6:
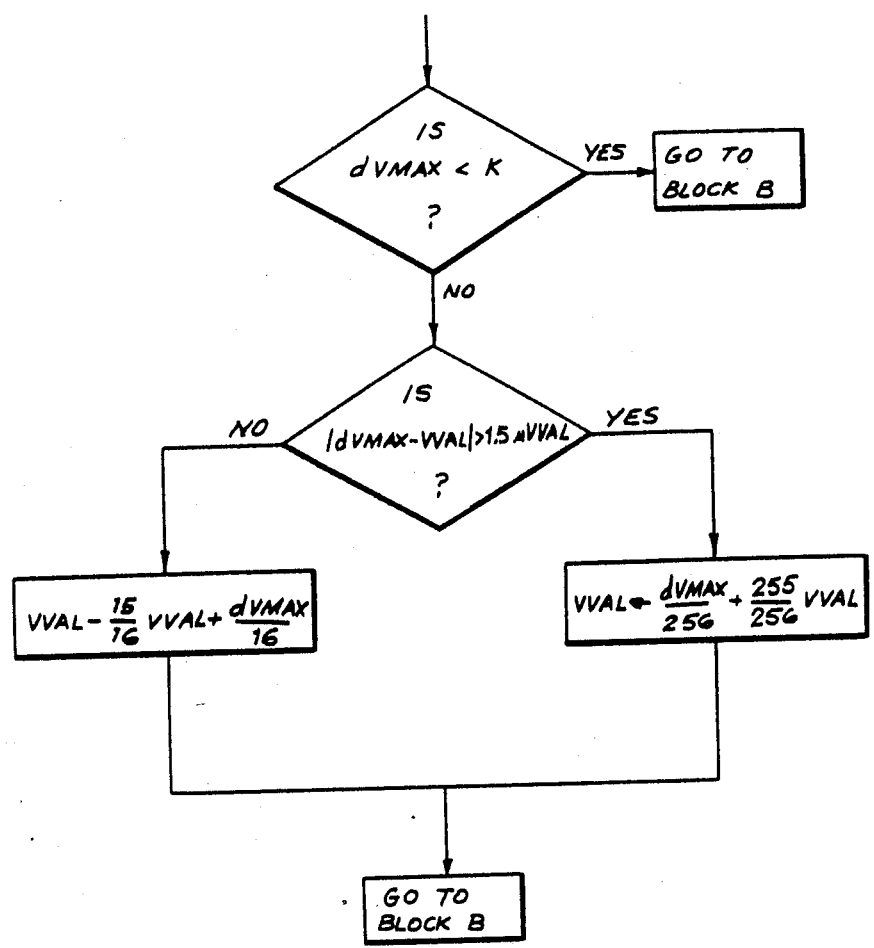
Figure 7:
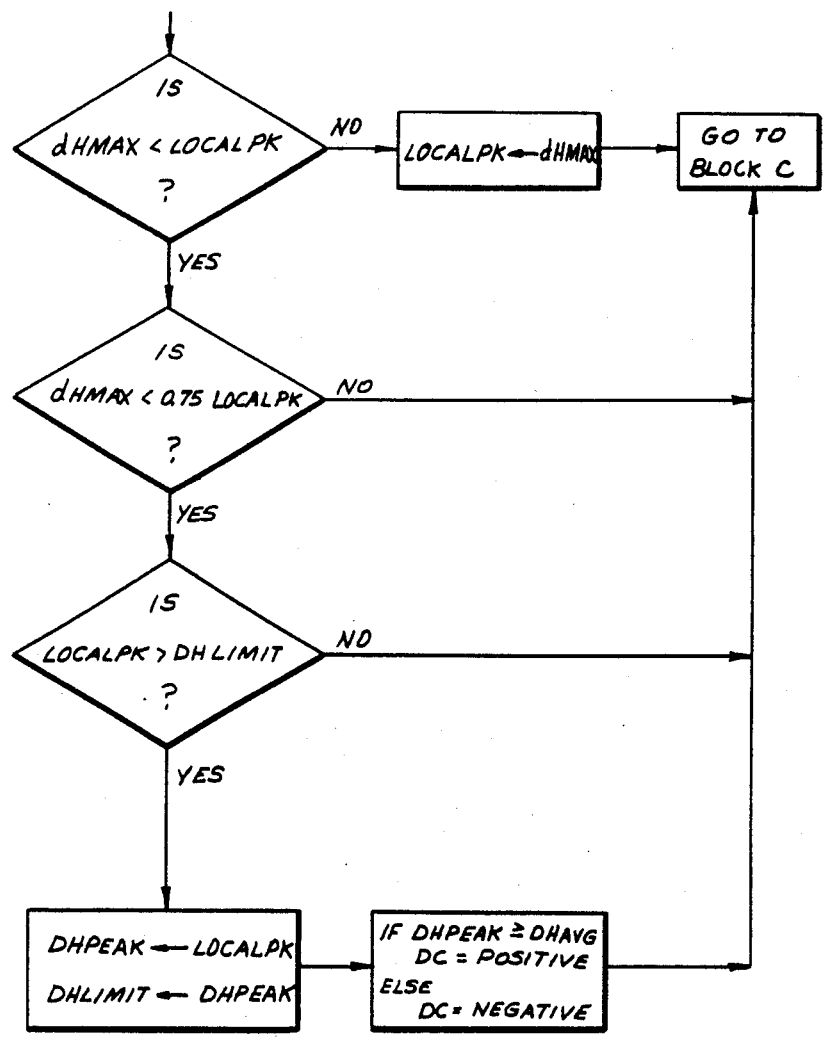
Figure 8:
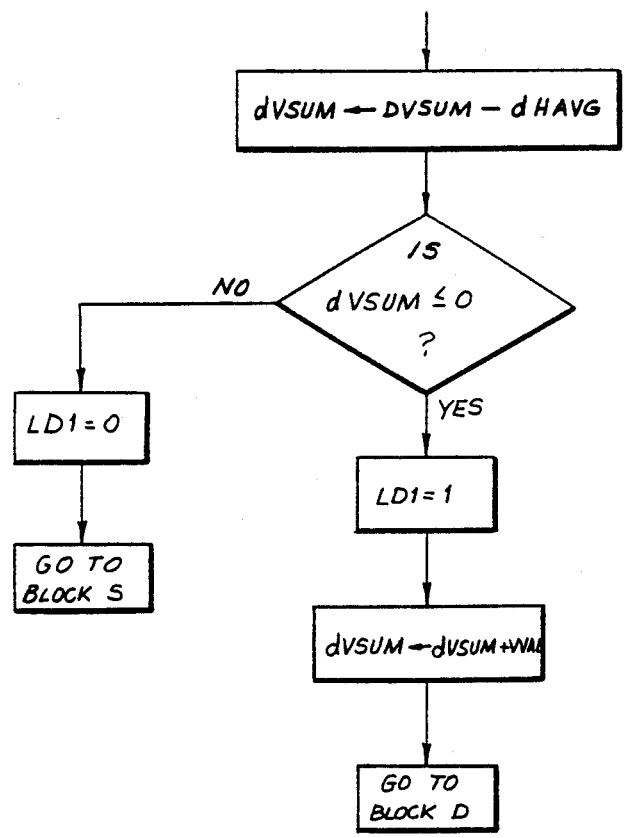
Figure 9:
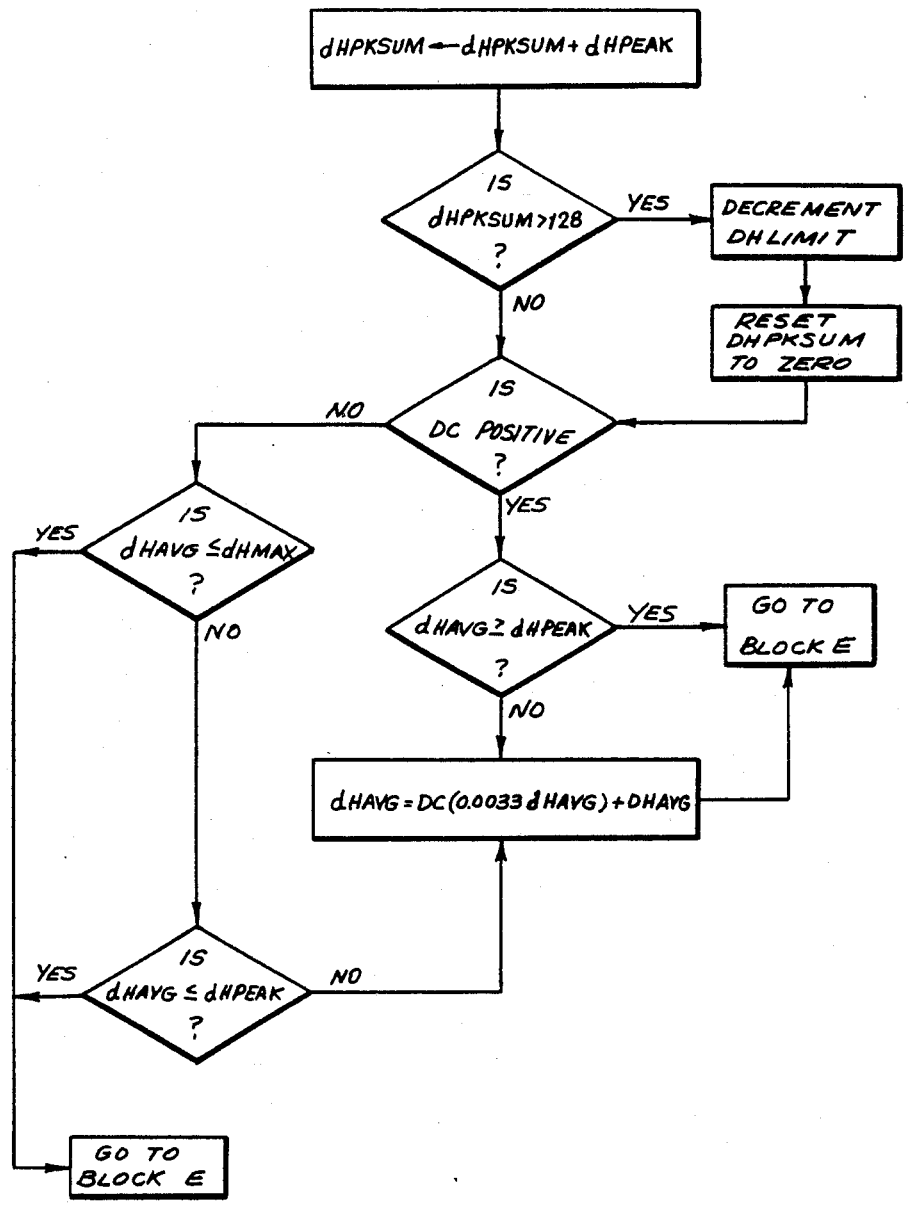
Figure 10:
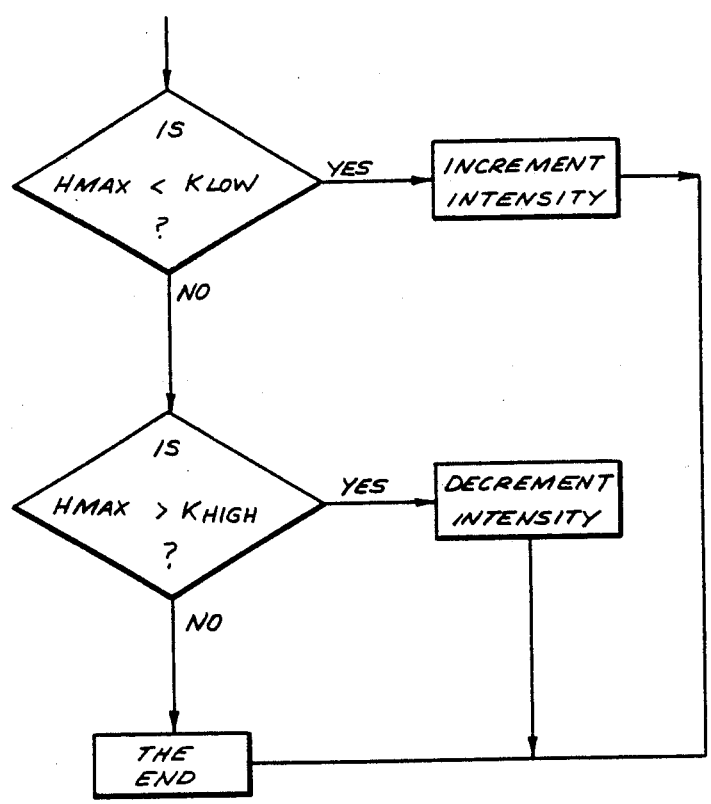

FIG's 6-10 are more detailed flow diagrams of portions of the flow of FIG. 5

Figure 1:
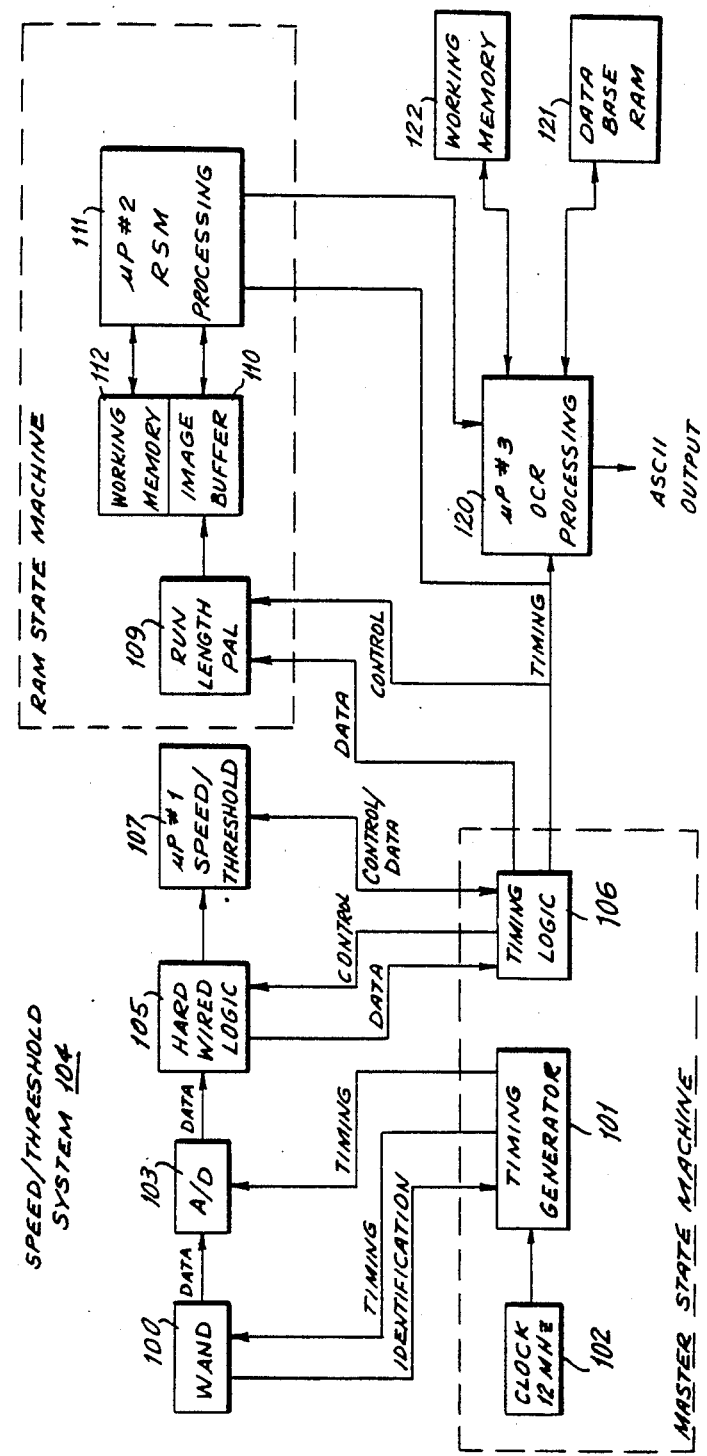
FIG. 1 is a simplified block diagram of an optical character reader in accordance with the preferred embodiment of the invention.
Figure 11:
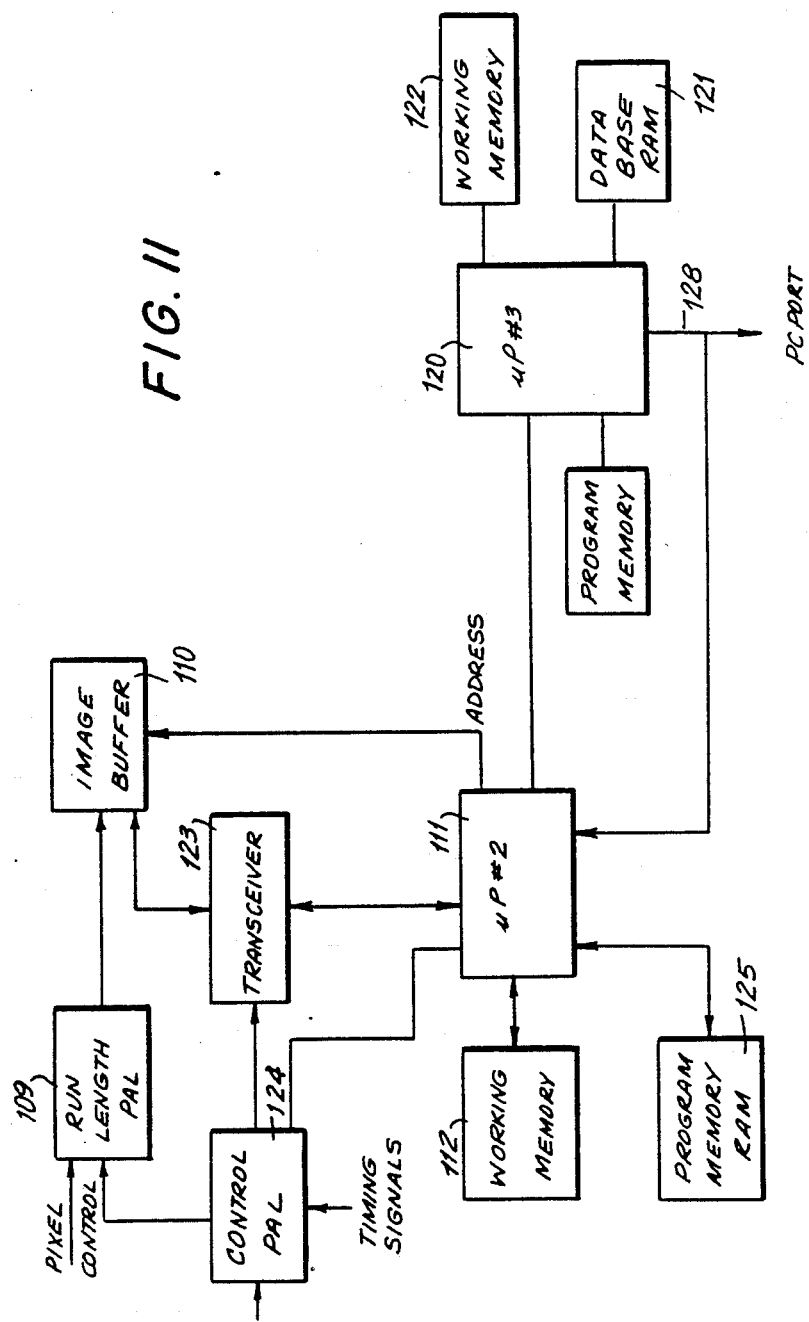
Figure 12:
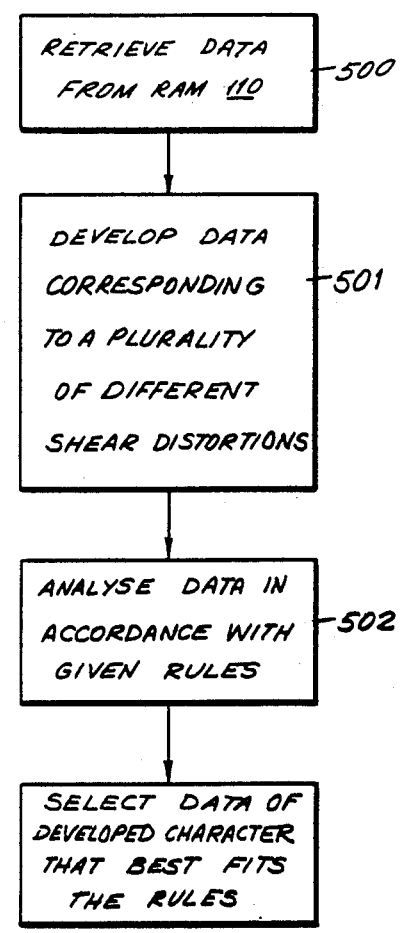
Figure 13:
Figure 14:
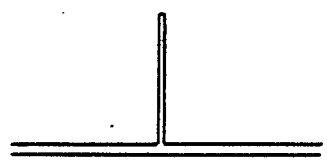
Figure 15:
Figure 16:
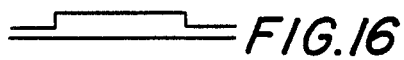
Figure 17:
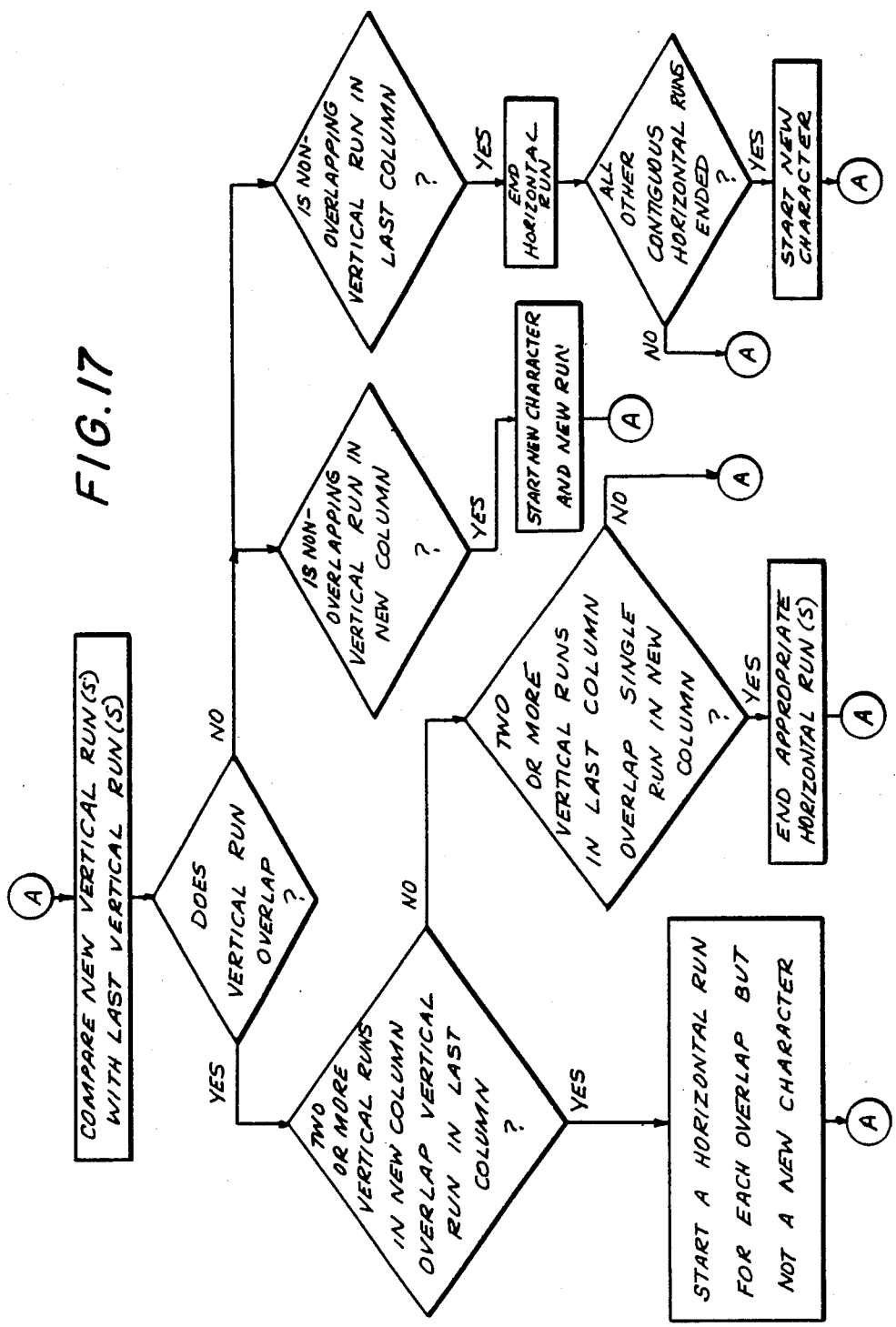
Figure 21:
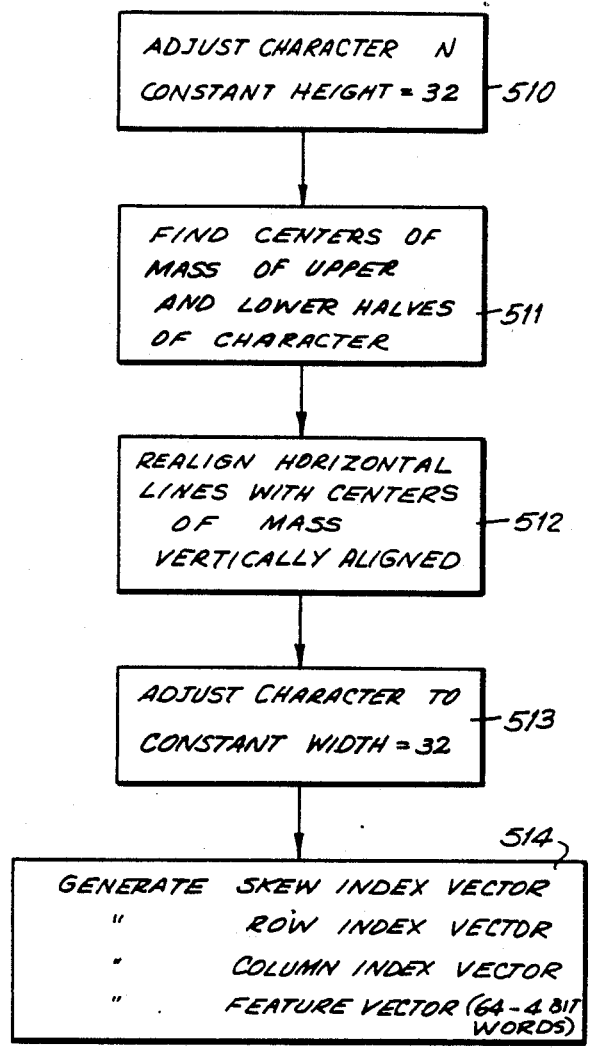
Figure 22:
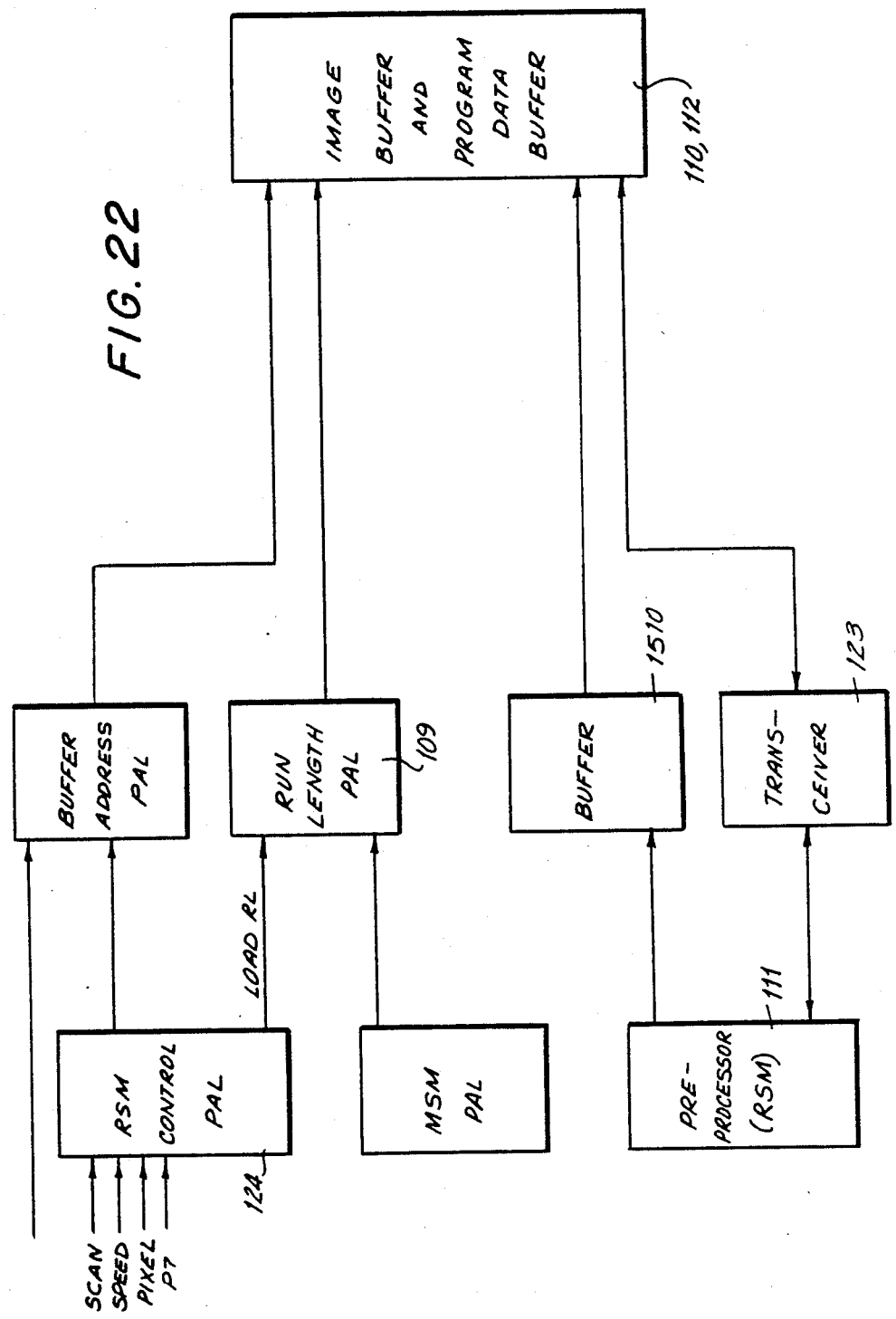
Figure 23:
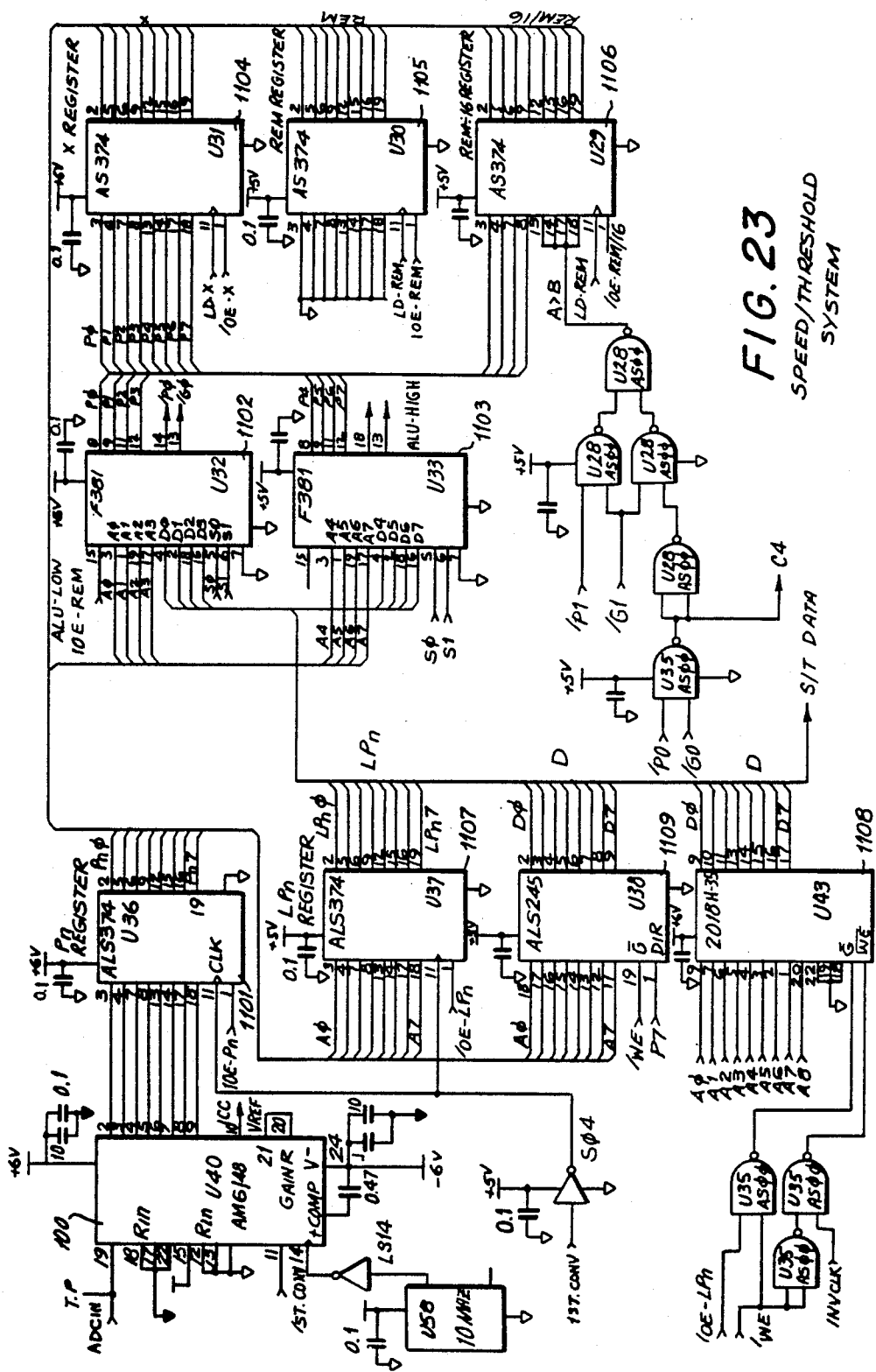
Figure 24:
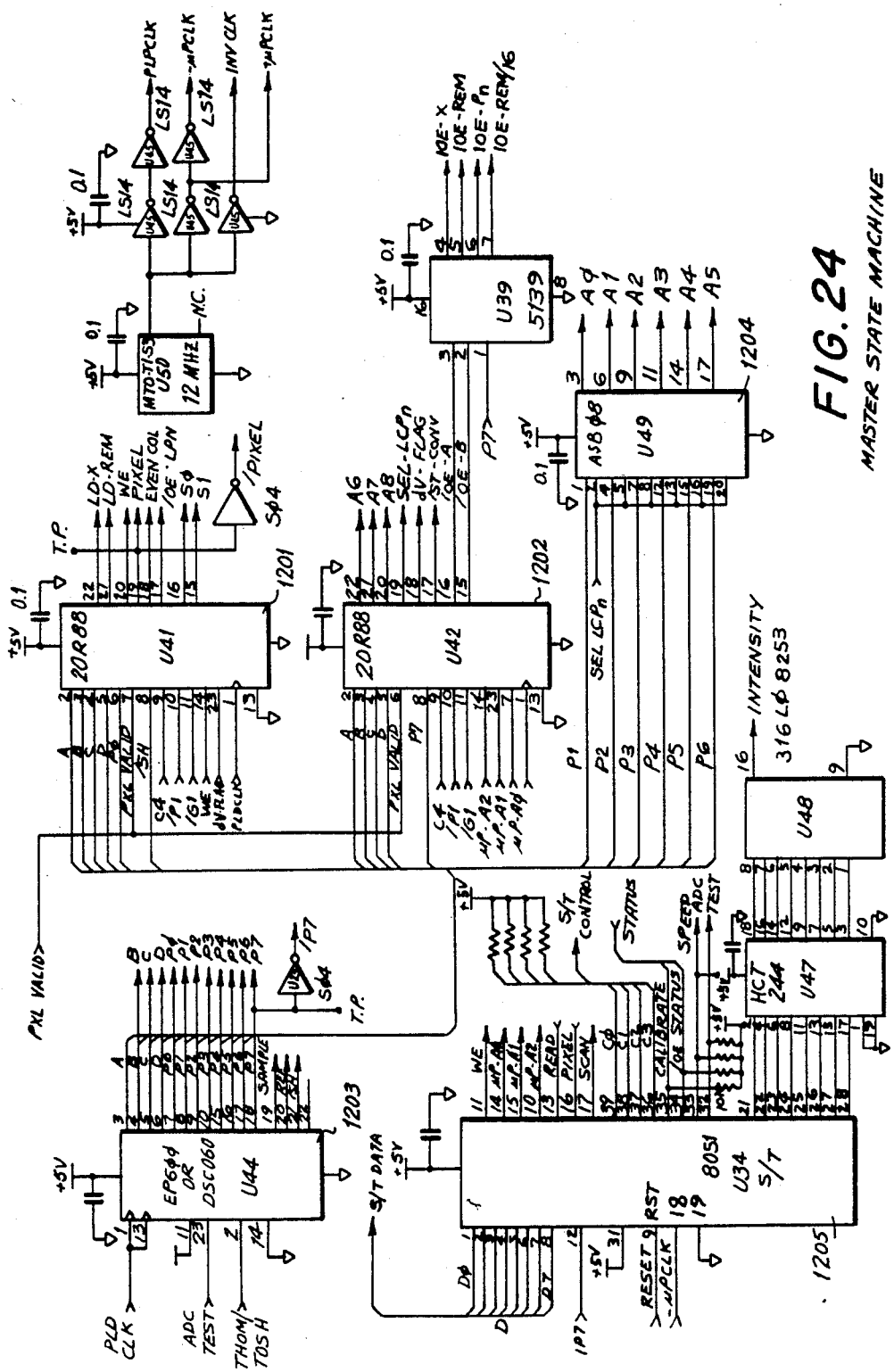
Figure 25:
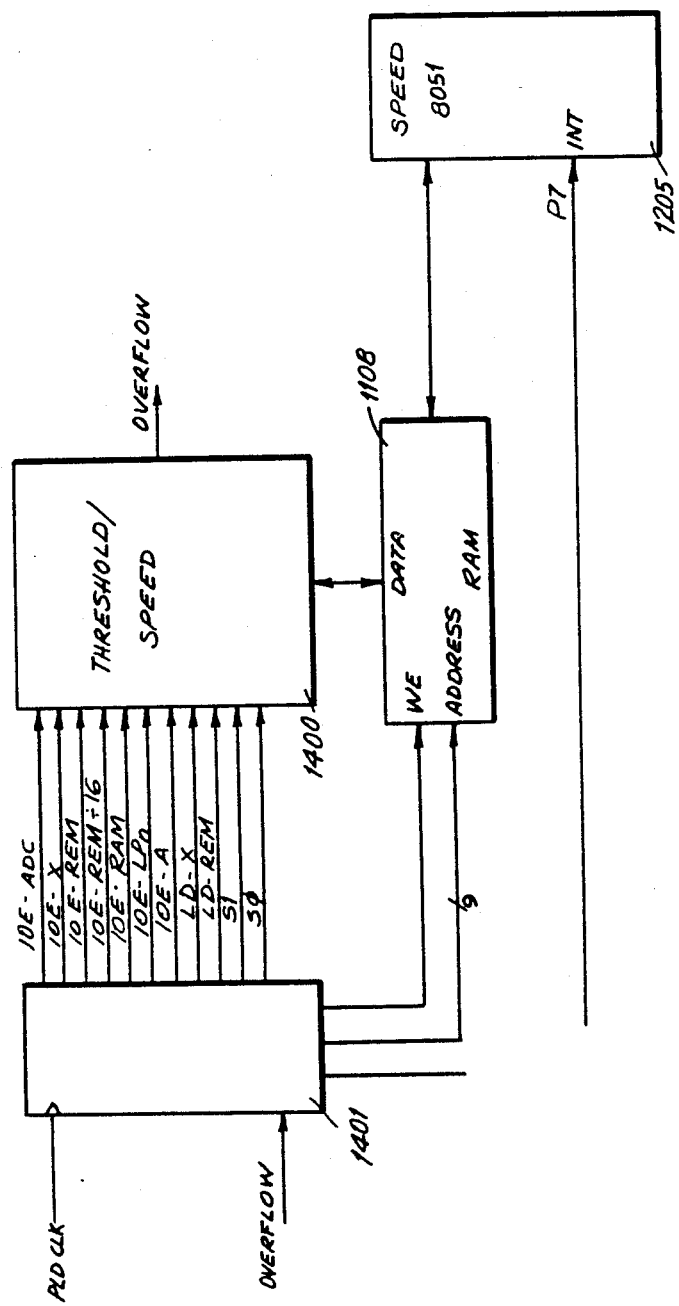
Figure 26:
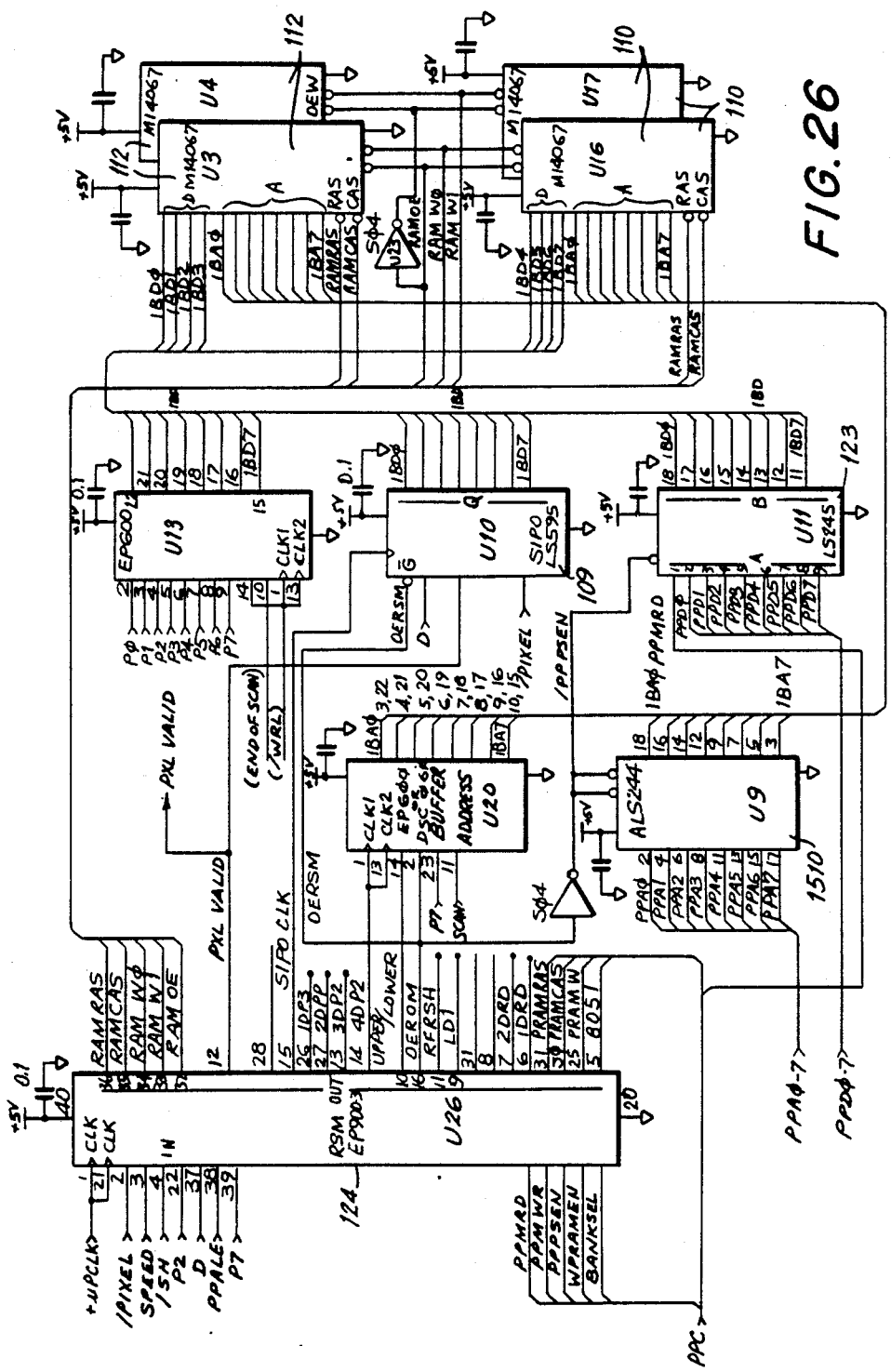
Figure 27:
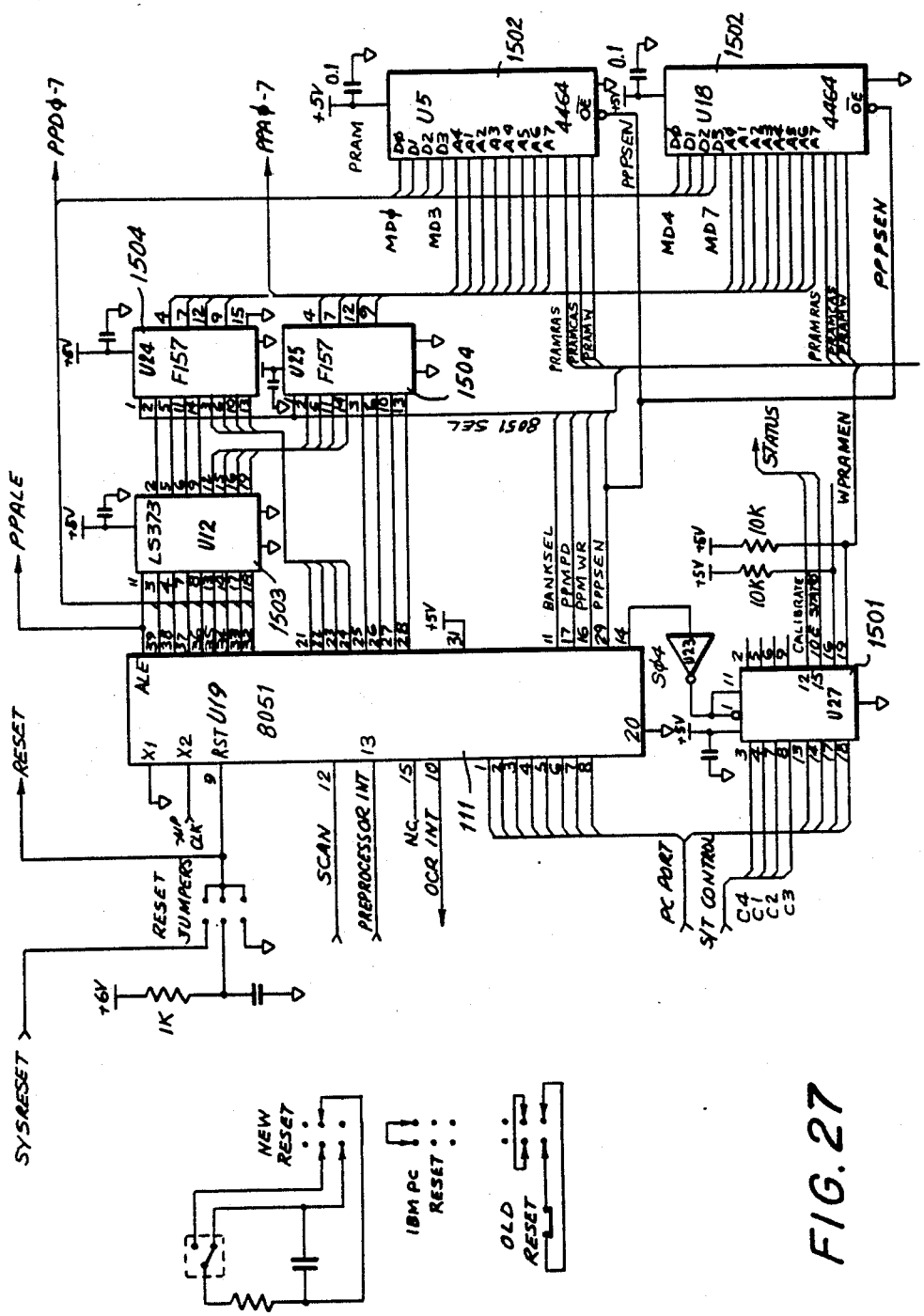
Figure 28:
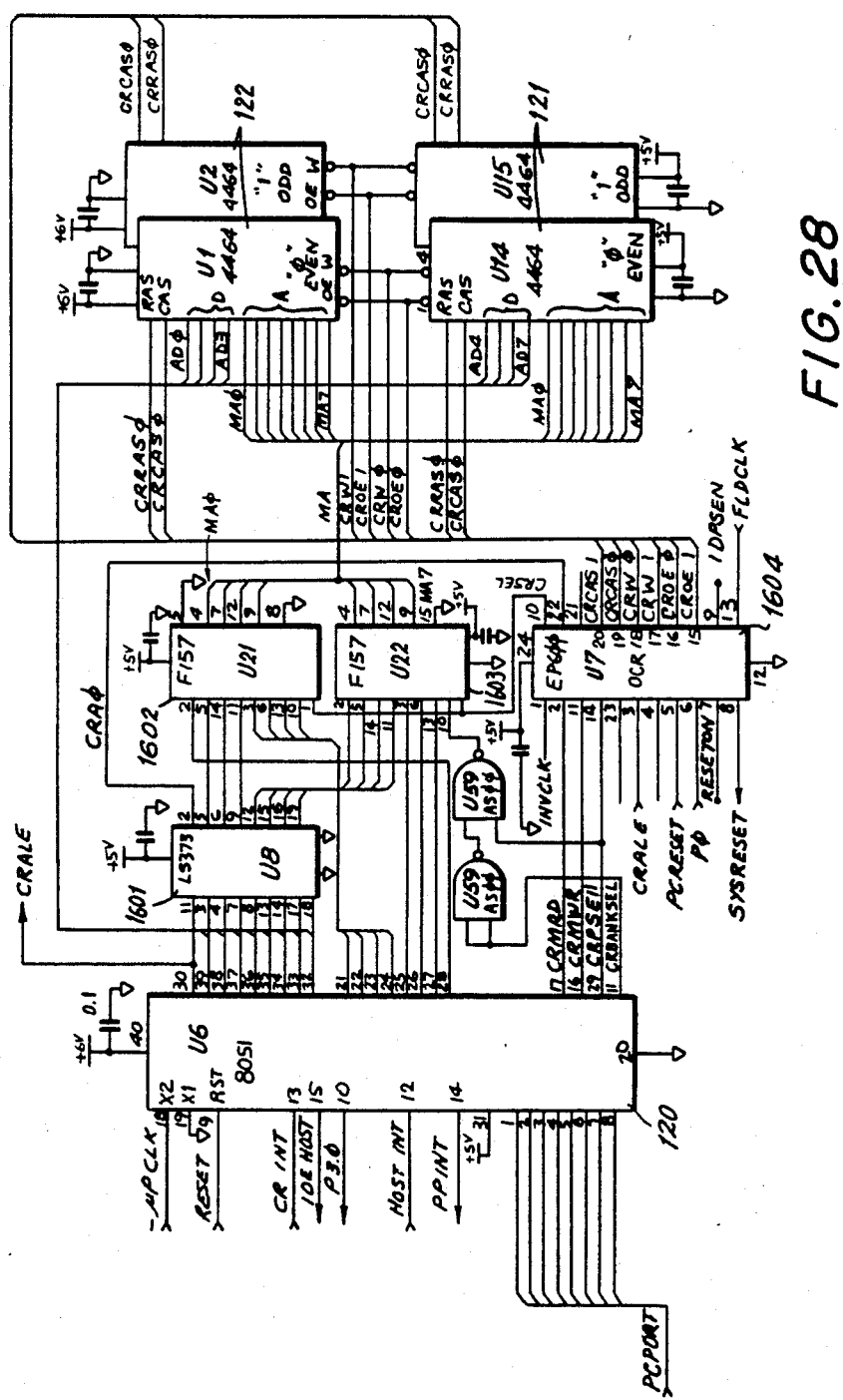
Figure 29:
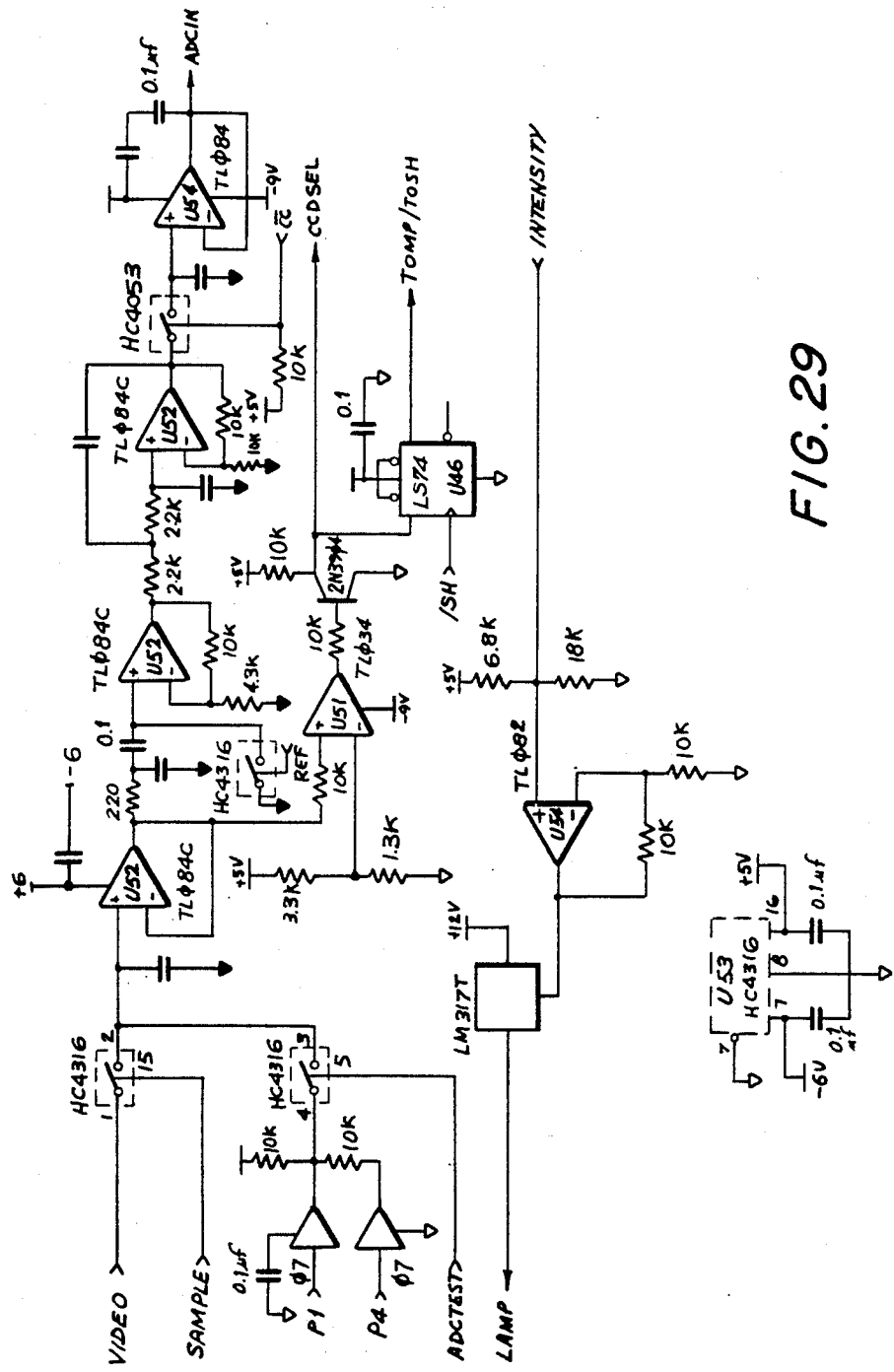
Figure 30:
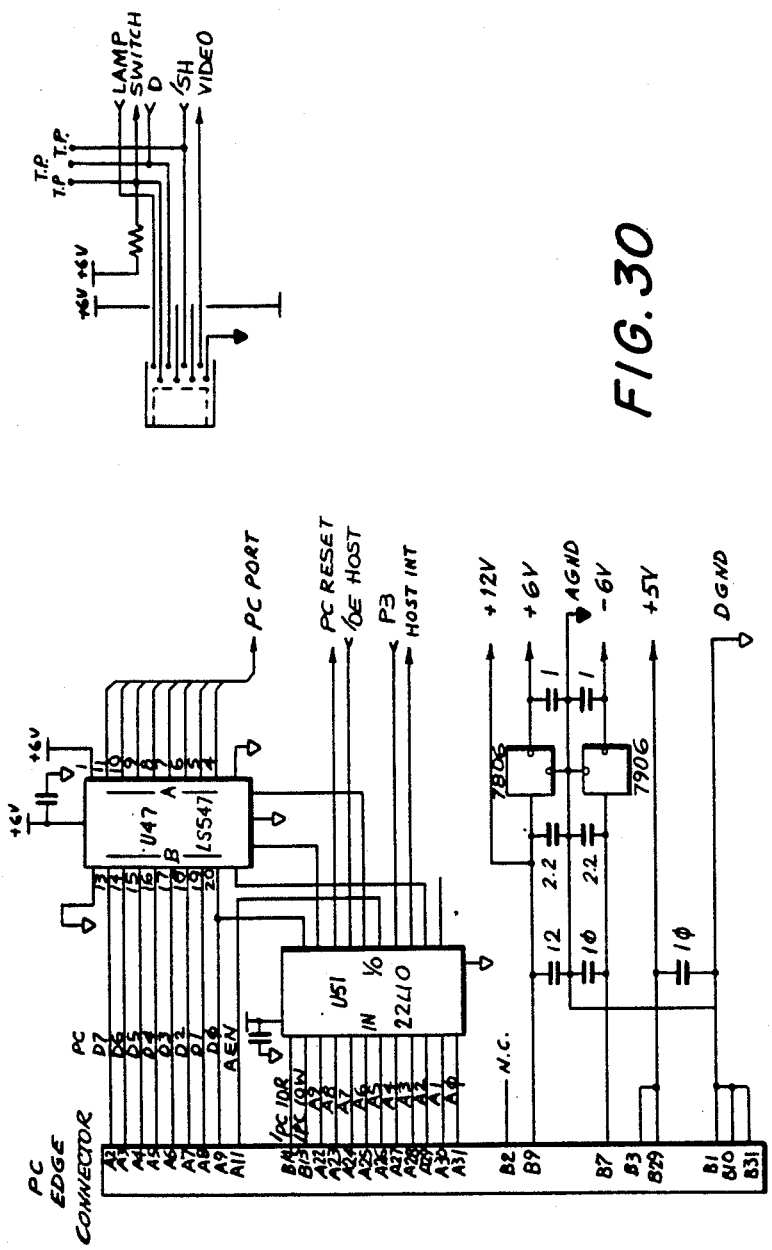

FIG. 11 is a block diagram illustrating in greater detail a initial processing circuits of the system of FIG. 1;

FIG. 12 is a simplified block diagram of a method for correcting shear of characters in accordance with the invention;

FIG. 13 is an illustration of a character without shear distortion;

FIG. 14 is an illustration of a horizontal histogram of the character of FIG. 13;

FIG. 15 is an illustration of a character with shear distortion;

FIG. 16 is a horizontal histogram of the character of FIG. 15;

FIG. 17 is a flow diagram illustrating a technique in accordance with the invention for character separation;

FIG. 18 is an illustration of a simplified character for explaining a character separation technique in accordance with the invention;

FIG. 19 is a dot image of the character of FIG. 18;

FIG. 20 illustrates the generation of data concerning vertical and horizontal runs of the character of FIGS. 18 and 19;

FIG. 21 is a simplified block diagram illustrating skew correction and the generation of feature vectors;

FIG. 22 is a simplified block diagram of the portion of the system of the invention illustrated in FIG's 26 and 27;

FIG. 23 is a more detailed block diagram of the initial processing circuits of the system of the invention;

FIG. 24 is a more detailed block diagram of the Master State Machine of the system of the invention illustrating the timing and further logic systems;

FIG. 25 is a simplified block diagram showing the relationships of the elements of FIGS. 23 and 24;

FIG. 26 is a block diagram illustrating in greater detail the image buffer system of the arrangement of the invention;

FIG. 27 is a block diagram in greater detail showing the processing circuits employed in combination with the circuit of FIG. 26;

FIG. 28 is a more detailed block diagram illustrating the character recognition processor system of the preferred embodiment of the invention;

FIG. 29 is a circuit diagram of the interface between the wand and the hard wired circuit of the invention; and FIG. 30 is a block diagram of an interface that may be employed for using the system of the invention in combination with and IBM PC microcomputer.

DETAILED DESCRIPTION OF THE PREFERRED EMBODIMENT

Referring now to the drawings, and more in particular to FIG. 1, therein is illustrated one embodiment of an optical character recognition system in accordance with the invention employing a hand-held wand 100. The system employs a timing generator 101 responsive to a clock 102 for producing the timing signals for the system. The clock may have a rate, e.g. of 12 mHz. The timing generator 101 controls the scanning of the wand 100, to effect the application of sequential data to an analog/digital converter 103 in a state machine 104. The timing generator 101 may receive identification signals from the wand, if desired, in order to enable the control of the timing signals to adapt the system to various makes or manufacturers of sensors.

The output of the analog to digital converter is applied to a hard wired logic circuit 105 under the control of the timing generator, the hard wired logic circuit being further controlled by a timing logic circuit 106 responsive to outputs of the timing generator in order to rapidly determine certain logic functions of the signals, the hard wired logic circuit 105 being employed in order to avoid the necessity of unnecessary increases in the state of operation of a microprocessor 107. The hard wired circuit 105 performs the threshold function and generates certain information which is sent to a microprocessor 107 where speed is calculated. The speed function is necessary in order to compensate the received signals for variations in the speed of movement of the wand across a line of text, it also accomplishes data compression. The threshold function is necessary in order to convert the grey scale image to binary information, the threshold level being continually adjusted as the wand is moved across the text. The control and data output of the first microprocessor 107 is applied to the timing logic circuit 106, which may be comprised of a plurality of PALs, with the thresholded data being directed therefrom to a run-length PAL 109. It is noted that, in a modification of the invention, a SIPO shift register may alternatively be employed instead of the PAL 109, for substantially the same function. The runlength PAL 109 is read out to an image buffer memory 110, with determined columns of data being deleted in the readout on the basis of a control signal from the timing logic circuit 106, to compensate the width of readout characters for speed of movement of the wand. The image buffer 110 constitutes one memory of a second microprocessor 111, this second microprocessor having a further working memory 112. The microprocessor 111 processes data in the image buffer 110 to provide further corrections, such as for shear, non-horizontal movement of the wand along the line of text (line straightening), as well as to separate the received and stored data on a character-by-character basis.

A third microprocessor 120 is coupled to a database RAM 121 having stored therein determined data relating to characters of fonts with which the scanned text is to be compared. The processor 120 has a further working memory 122. Data processed by the second microprocessor 111 is directed to the third microprocessor 120 to effect the comparison of determined data corresponding to the unknown read characters with the stored data of the known fonts. The data in the image buffer 110 may be processed further in this regard either in the microprocessor 111 or microprocessor 120, to correct for skew and variations in size and to effect a standardization of the format for the data, this task being preferably effected in the microprocessor 120. In addition, the microprocessor 120 derives determined vectors from the unknown data for comparison with the stored data in the data base, to provide an output, which may be in the form of upper case Ascii coded signals as indicated in the figure.

Figure 2:
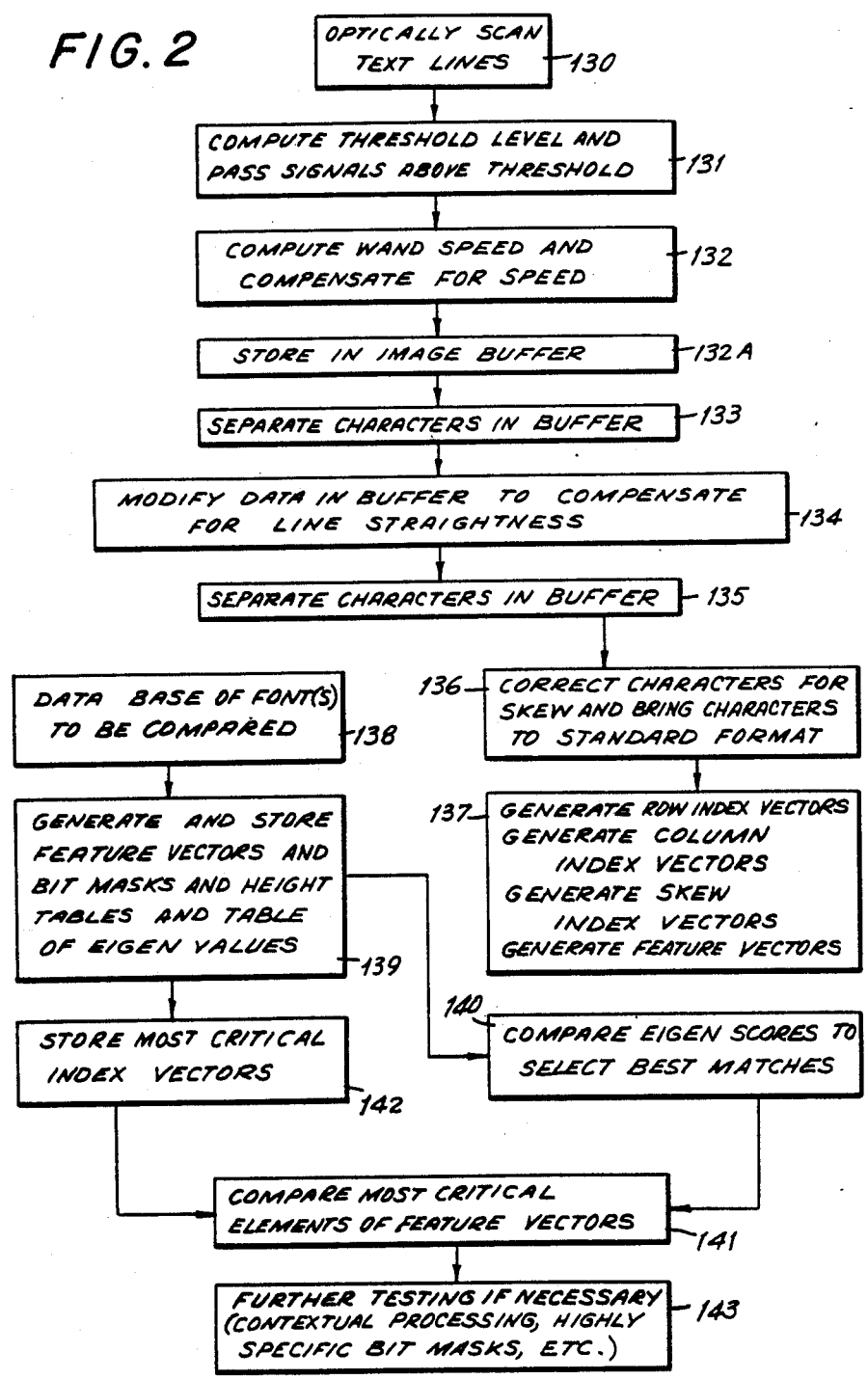
FIG. 2 is a flow diagram illustrating a preferred method of operation of the invention.

In order to further assist in the understanding of the invention, FIG. 2 is a flow diagram of the manner of operation of the optical character reader in accordance with a preferred embodiment of the invention. It is of course to be understood that this diagram, as well as the block diagram of FIG. 1, are only brief overviews of a preferred embodiment of the invention, for the purpose of orientation, and variations in the system and method are of course permissible within the scope of the invention. As illustrated in FIG. 2, at block 130 the output of the wand is processed to pass signals only above a determined variable threshold, the wand speed is computed and the signals will be recalled that the speed compensation was effected by the control of the shift register 109 of FIG. 1 so that determined columns of data are not read out to the image buffer 110. As further seen in FIG. 2, the speed and threshold compensated signals are stored in the image buffer at block 132. In addition the characters are separated at block 133, and modified to compensate for line straightness at block 134. Then the data stored in the image buffer is compensated for shear and size at block 135. The compensations effected in blocks 133-135 are preferably effected by the microprocessor 111, with the compensated characters being stored in the image buffer 110. Subsequently, the characters are corrected for skew error and are further modified to be brought into a standard format at block 136. This may be effected by either of the microprocessors 111 or 120 of FIG. 1, although it is preferably effected by the microprocessor 120. The thus "standardized format" characters are now employed to generate a 64 element identification or variable vector data group at block 137. This data group can be any number of rows and columns, or bits in rows or columns and can be broken into any number of groups. The same operation is done with each character for standardization. Each variable contains information relating to a feature of a character. This vector, in accordance with the invention is called a "feature" vector. It will be understood that a feature vector can include greater or lesser numbers of variables and several variables can represent a feature. This vector will be explained in greater detail in the following paragraphs. The feature vector is employed in order to simplify the task of comparing the unknown read characters with characters in the data base, since complete comparison of all the characteristics of each unknown characters with those of the characters in the data base would require such a great amount of time as to render the identification of characters by this technique impractical. The adaptability of this feature of the invention to non-portable character reading devices is of course apparent. To further simplify the comparison of unknown characters to those in the data base, 6 Eigen scores, (explained in detail below) are generated from the unknown's 64 element "feature" vector and are the basis for the first stage in identification of an unknown character.

The data base of the font(s) to be compared is also processed to produce corresponding feature vectors, bit masks, tables of Eigen scores and height table at block 139, this of course preferably being effected prior to operation of the machine. Such data may be read into the data base RAM 121 of FIG. 1 from an external source upon initialization of the apparatus.

In the initial comparison process, at block 140 the 6 Eigen scores of the unknown and data base characters are compared, in order to enable the elimination of most of the data base characters from consideration. Next, the most critical elements of the 64 elements feature that distinguish the unknown character from each of the resulting characters selected in block 140 may then be compared at block 141. The comparison at block 141 will result in the positive identification of the vast majority of read characters. Further tests may be necessary with respect to some characters, however, at block 142. Thus, it may be necessary to provide further analysis with respect to very similar characters such as upper and lower case O's and zeros.

Figure 3:
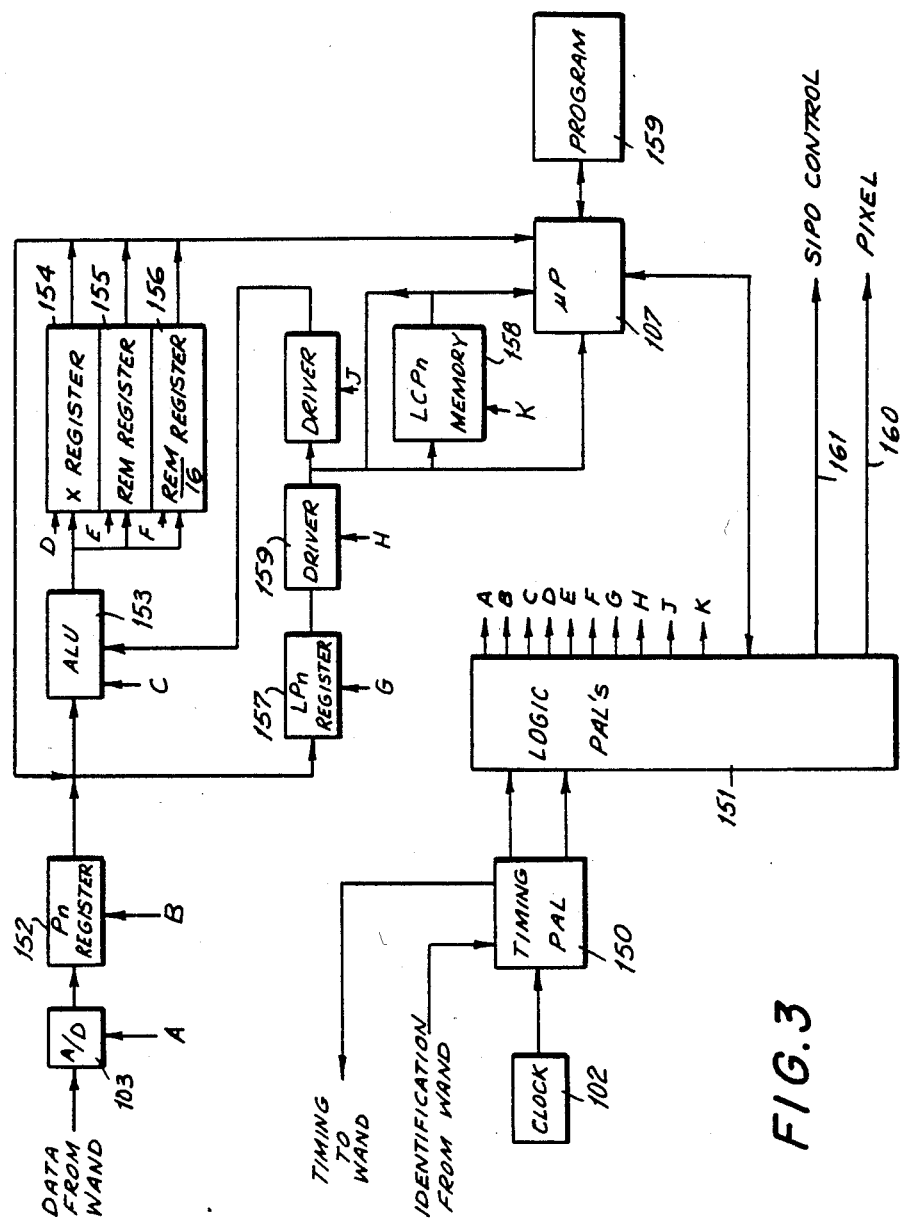
FIG. 3 is a simplified block diagram showing in greater detail speed and threshold circuits of the system of FIG. 1.
Figure 3A:
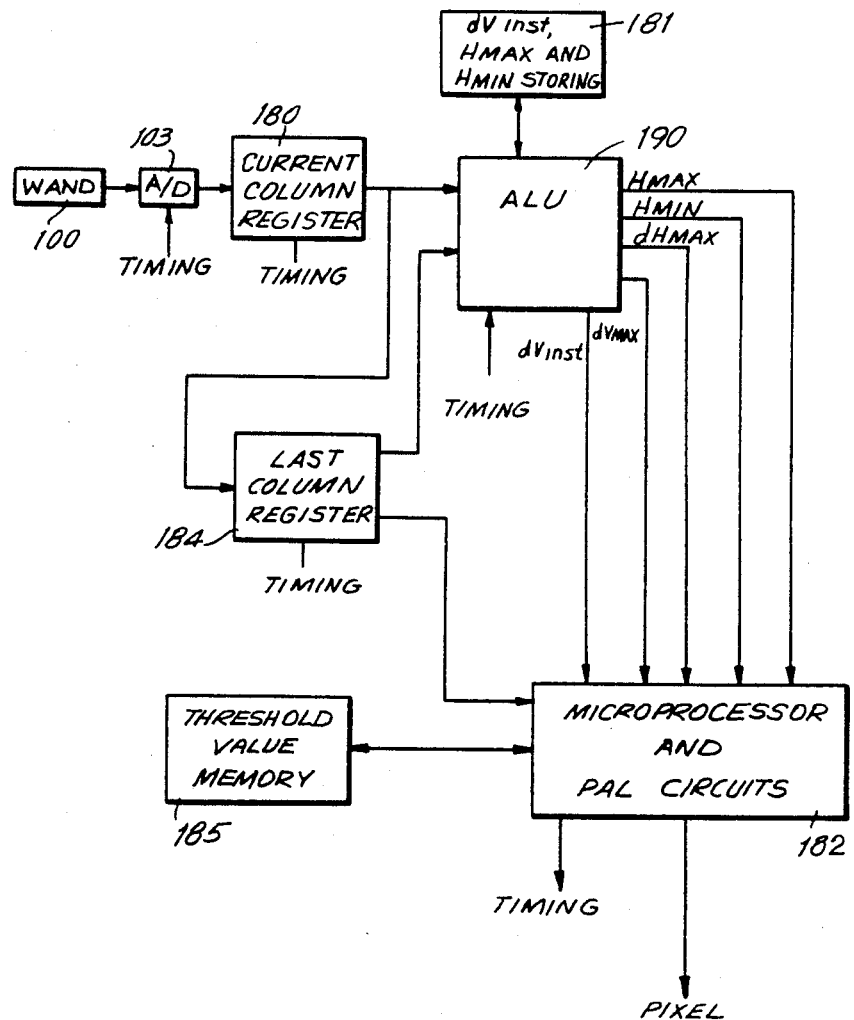
Figure 3B:
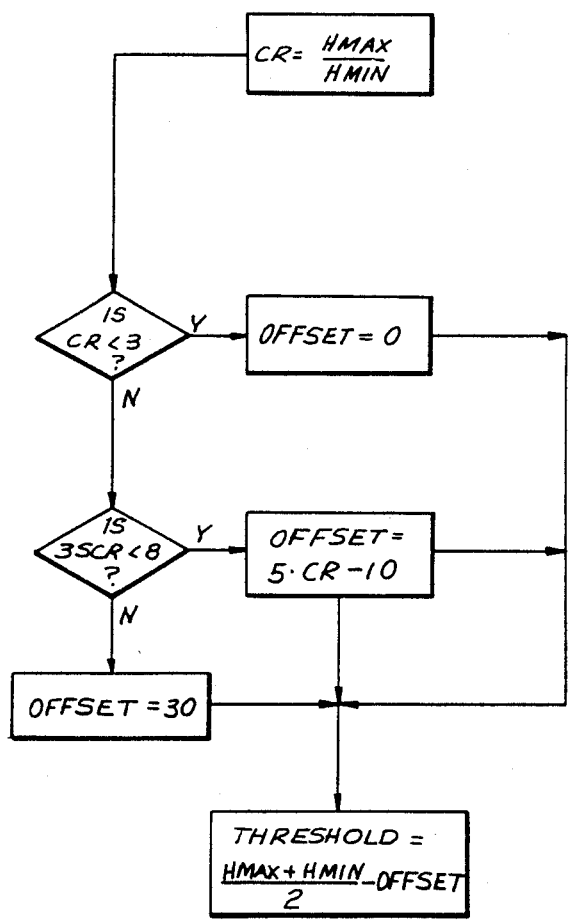
Figure 3C:
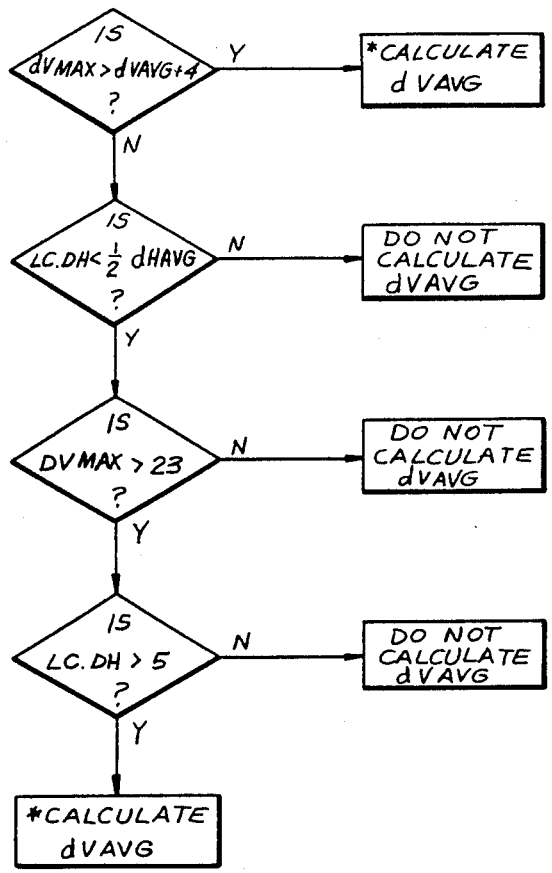
Figure 3D:
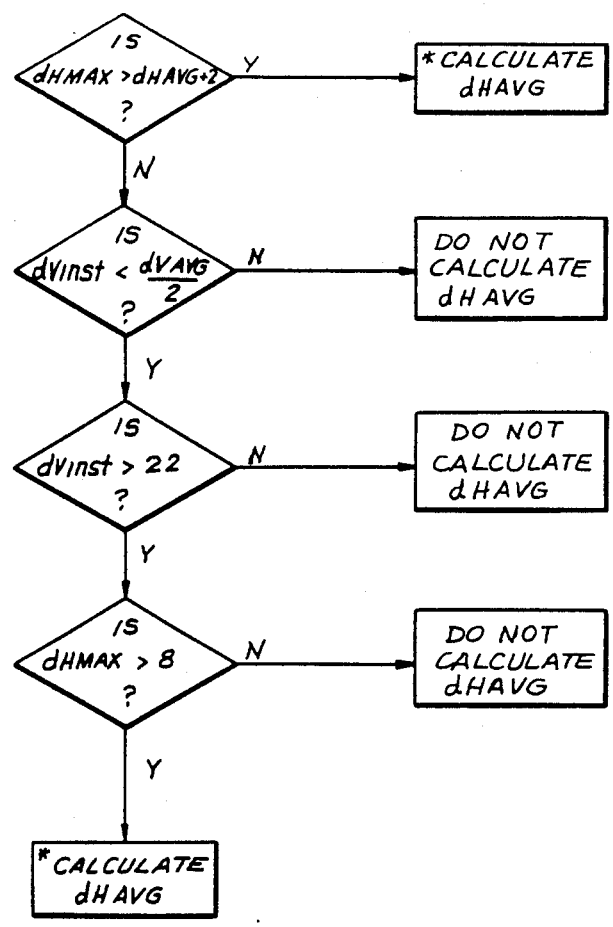

The hard wired logic circuit and associated circuitry of FIG. 1 is shown in somewhat greater detail in FIG. 3, wherein the timing generator is comprised of a timing PAL 150 which produces a plurality of timing signals for the timing logic circuit in the form of one or more programmed PAL's 151. The logic circuit 151 controls the read out of the analog/digital converter, in 8-bit parallel form to a Pn register 152. The instantaneous signal stored in the Pn register 152 is thus a digital number corresponding to the amplitude of light sensed by a single element of the CCD array in the wand. Under the control of the logic PAL's 151, this digital value is applied to an arithmetic logic unit 153, for example, one or more 74 ALS 381 DIPS, for the instantaneous calculation of values hereinafter discussed as X, REM and REM/16, for storage in registers 154, 155 and 156, respectively. The logic circuit 151 also controls the application of the data of register 152 to the last pixel register LPn 157, upon the formation of the necessary calculations for registers 154-156, the register 157 storing the data corresponding to the amplitude of the light received from the previously scanned element, in the vertical direction of the wand. The LPn data is applied under the control of the logic circuit 151 to a memory 158, by way of a driver 159. The memory 158 stores digital data corresponding to the amplitude sensed by each element of the wand in the scanning of the previous column. The calculated data as well as the data last received from the wand and the data corresponding to all sensed elements of the last column are processed under the control of the program in memory 159, to enable the generation of a threshold single bit of information corresponding to the last scanned element, to the logic circuit 151, as well as a control signal corresponding to the calculated speed of movement of the wand. The logic circuit 151 correspondingly outputs the threshold adjusted digital signal serially on line 160, and outputs a control signal on line 161 for the run length PAL 109 of FIG. 1, enabling control of whether the run lengths stored in the run length PAL 109 will be read out or not. The signal "PIXEL" on line 160 has either a high or a low logic value corresponding to whether the output of the instantaneously scanned element of the wand is above the determined threshold level or not.

The Wand

In a preferred embodiment of the invention, the wand or scanner 100 is comprised a CCD line scanned image sensor, for example, of the type TCD104CD, manufactured by Toshiba, having 128×1 elements, or Type TH7806 manufactured by Thomson, having 256×1 elements, connected to operate in a 128×1 mode. A lens system of conventional nature is provided to focus respective small areas of a scanned surface onto each cell. The image is about 1 cm or about ⅜ of an inch in height, thereby having a "view" of approximately 2½ single spaced typed lines.

The elements of the line image sensor are serially scanned at a rate of about 1.3 microseconds per element under the control of generator 101, with a delay of about 30 microseconds between each complete scan of 128 elements. The output of the wand is an analog signal of sequentially occurring amplitudes corresponding to the instantaneous current light intensity directed to (i.e. reflected from the paper to) the corresponding cells of the sensor. The control signals for the wand are derived in the Master State Machine (MSM), as will be discussed, enabling synchronization of these signals with the remainder of the system.

The wand is adapted to be moved across text to be read in a direction substantially longitudinal with the lines to be read with the elements of the CCD image sensor extending normal to the line of text. The elements of the sensor are hence scanned in a direction normal to the longitudinal direction of the lines, such scanning being referred to herein as being in the vertical direction. The scanning of the sensor may occurs from the top to the bottom or vice versa. The output of each element, during a scanning of the sensor is hereinafter referred to as a pixel.

Definition of Variables Used in the Speed Threshold Circuit

In order to clarify the following disclosure, the terms that are employed therein are defined as follows:

HMAX—The pixel of the greatest magnitude found in one column.

dHMAX—Pixels out of the CCD are compared on an every other column basis. Pixels in the CCD are given a number 0 to 127. The nth pixel in one column of interest is compared to the nth pixel in the next column of interest. The maximum difference found in this fashion is called dHMAX.

dVMAX—Adjacent pixels in a column are compared. The maximum difference found between adjacent pixels in one column is called dVMAX.

Note—The three variables defined above are calculated in the Threshold/Speed hardware block. These three variables are all used in the Speed software. The following variables are Speed software variables.

VVAL—Filtered version of the variable dVMAX. When the wand is being scanned across text dVMAX will be more or less constant. However, when the wand is between characters dVMAX will get quite small. When this occurs the Speed software will detect this and disregard those values.

dHPEAK—The largest dHMAX read from the hardware out of many dHMAX values, is over one character. The level of dHPEAK is the level to which the variable dHAVG will slowly be adjusted.

dHLIMIT—dHLIMIT basically sets the rate at which dHMAX values can be called dHPEAK's. The larger the current dHPEAK the faster the software can declare a dHMAX to be a dHPEAK. The lower the current dHPEAK the slower the software can declare a dHMAX to be a dHPEAK. This is part of the way the number of columns that are loaded in the image buffer is restricted to change by no more than 10% across the width of one character.

DC—This variable is a flag that tells the Speed software whether or not the variable dHAVG should be incremented or decremented.

dVSUM—A running sum of VVAL conditioned by the subtraction of dHAVG.

dHAVG—A filtered version of dHMAX values. This is the variable that is used, along with dVSUM and VVAL, to compute the value of LD1, dHAVG is adjusted so that it will track at the level of the variable dHPEAK. It can only be adjusted if LD1=1.

dHPKSUM—A running sum of the variable dHPEAK used in determining when the variable dHLIMIT can be adjusted. When dHPKSUM reaches a predetermined level then dHLIMIT can be decremented.

LD1—This is a single bit variable that is computed from the successive subtraction of dHAVG from dVSUM. If LD1=1 then the hardware in the RSM block will load a column of data into the image buffer, if LD1=0 then the column of data is thrown out.

Threshold Level and Speed Correction

In order to enable the reconstruction of sensed characters to a form that will enable their recognition, it is necessary to provide compensation for the speed of movement of the wand across the material being scanned. Without such correction, it is apparent that a slow movement of the wand would result in the sensing of characters of substantially greater width than if the wand is moved across the material rapidly. Conceptually, compensation for the speed of movement of the wand is effected by elimination of determined columns of data output of the wand in the event that the speed is slow, or, alternatively, replication of determined columns of data from the wand if the speed of the movement of the wand is rapid. In this sense, the term "column" refers to the output of the sensor for a single scan for the 128 pixels, the pixels being vertically oriented (i.e. with respect to text being scanned).

In accordance with the invention, speed of movement of the wand is sensed as a function of the ratio of the filtered dHMAX values to the filtered dVMAX value dHmax/dVmax, where dH is the change of amplitude of pixels from column to column, dHmax being the maximum value of dH sensed, on a pixel by pixel basis, between every other sensed columns, dV being the change of output between adjacent pixels in the vertical direction, i.e., in a given column, and dVmax being the maximum value of dV in a current column. Maximum changes occur when the adjacent black/white or white/black pixels are on a boundary which is normal to the direction of scanning. This determination of speed is based upon the premise that the maximum change of values in the vertical and horizontal directions will result from a black to white or white to black transition where the transition is normal in the direction of scanning, and that lack of definition of these transitions in the vertical direction is caused by factors other than the speed of movement of the wand, for example, due to variations in paper quality. Consequently, the ratio of the filtered maximum values of change in the horizontal and vertical direction serves to produce a function that varies with speeds of movement of the wand, and is not influenced by various other variables such as quality of print of paper. The signal that is produced from this ratio is hence employed in the system of the invention to enable the replication of the column data for consideration, as a function of speed, as the speed of movement of the wand is increased, or to delete from consideration column data, as a function of speed, as the speed of movement of the wand is decreased.

The speed of movement of the wand will generally be within the range of ½ second per line of text to 6 seconds per line of text. It is asserted that the maximum rate at which an operator can accelerate the wand, assuming a 128 pixel CCD sensor scanned at 1.3 microseconds per pixel, will result in a maximum change in differential in the output of the pixels over one character of no greater than 10%. Accordingly, in the calculation of filtered dH max (dHAVG), it must be assumed that no greater change in amplitude than 10% can occur over one character, and hence acceleration over one character is limited to 10%. This feature and that of dH limit avoid consideration of mechanically erroneous or impossible values. It is preferred that the dH max values be separately determined for every other column of data. The dV-max values can be expected to change to a much lesser extent than the dH-max values, however, and the dH max values may hence be averaged from column to column in a low pass filter, and the maximum change is limited to less than 10% per character.

The function of the speed hardware is to compute three variables HMAX, dHMAX and dVMAX. These variables are used in the speed software to determine the speed at which the wand is being moved across text. The speed software is then able to tell the hardware whether or not it should load a column of data. The slower the wand moves the smaller the number of columns of data that will be loaded into the image buffer. The faster the wand moves the larger the number of columns of data that will be loaded into the image buffer.

The speed software conditions the variables dHMAX and dVMAX so that certain values of no interest will have no effect in determining the ratio of the number of columns loaded to the number of columns that are thrown out. In this way, a character that has been "speed adjusted" will exhibit the same uniformity as it did on the paper from which it was scanned. In other words, the "adjusted speed" is not allowed to change such that it would introduce distortions in any characters scanned by the wand.

The speed software also has the task of controlling the intensity of the lamps in the wand. This is done by looking at the magnitude of the variable HMAX. If HMAX is found to be below/above a predetermined level then the lamp voltage is adjusted so that the intensity of the lamps is increased/decreased. This will occur until the HMAX values are seen to servo into a range of values that will result in the best overall analog signal out of the wand.

In order to provide more reliable signals and compensate, for example, for variations in paper and print quality, the system in accordance with the invention dynamically calculate a variable threshold value which is compared to each pixel to determine if that pixel should represent white (paper) or black (text). The threshold value is determined on a pixel to pixel basis, in accordance with the following relationship:

$$Th = 15Tho/16 + LPn/16$$

(This calculation is only performed if the absolute value of Pn−LPn is greater than K (i.e. on black-white or white to black transitions). wherein Th is the threshold level to be applied with respect to the current signal. Tho is the threshold level applied with respect to the previous signal, and LPn is the amplitude of the previous received pixel. The threshold approaches the level where the derivative of pixel intensity is maximum.

The threshold thus varies from pixel to pixel in dependence upon the slope of the dark-to-light and light-to-dark transitions sensed by adjacent elements of the sensor.

The threshold for the pixels is effected preferably by hardware in view of the speed with which they must be done. Thus, as discussed above, the current threshold level is defined as:

(1) $Th = 15/16 Tho + LPn/16 + K$
(2) $Rem = Tho - LPn$
(3) $Th = Tho - Rem/16 + K$

Relationship (1) is preferably calculated in 12 bits, with relationships (2) and (3) using 8 bit arithmetic to calculate the twelve bit number Th of relationship (1).

The arithmetic logic units 153 of the hard wired logic unit 105 automatically calculate the Rem and Rem/16 values for storage in the registers 155, 156 of FIG. 3, upon receiving the proper control signals from the PAL circuit 151 of FIG. 3. The Tho value, from the previous threshold determination, is stored in the Speed/Threshold 158 and brought up-to-date as the current Th value in response to enabling by the PAL control circuit. The hardware circuit thus performs the calculations of block 80 of the flow diagram of FIG. 4, to provide a value X corresponding to the current threshold value to be applied.

Description of the Threshold/Speed Flow Chart

Still referring to FIG. 4, the amplitude of the last pixel, LPn is tested with respect to the new threshold value X, and if it is larger than the value X, the signal PIXEL is set to 1. Otherwise, the value of PIXEL is set to 0. The variable PIXEL thus is the signal indicating whether the elemental area of the surface being scanned by a single element of the sensor is to be classed as dark or light.

BLOCK 201:

Block 201 insures that the threshold/speed hardware is active only when valid pixels are being received from the wand. After 128 consecutive valid pixels the hardware receives approximately 30 invalid pixels which are ignored by the hardware. During this time, software examines the current threshold value and either increments or decrements the threshold value so that the threshold value approaches a nominal value within the valid range of pixel values. The MSM and RSM PAL's synchronize the threshold hardware so that it operates only when the pixels are valid.

BLOCKS 202, 203, and 204:

The function of blocks 202, 203, and 204 is to determine the absolute difference between the current pixel, Pn, and the last pixel, LPn. This value is then used in the comparison in block 205.

BLOCK 205:

Block 205 compares the absolute difference of Pn and LPn to a constant ALPHA which software has stored in the speed/threshold RAM. If Pn−LPn is greater than the constant ALPHA, a white to black or black to white transition has occurred which is of a magnitude great enough that the threshold and dVMAX values should be updated. If Pn - LPn is not greater than the constant ALPHA, the dHMAX value is updated.

BLOCK 206 and 207:

As mentioned, blocks 205, 206 and 207 are executed only when /Pn−LPn/ is greater than the constant ALPHA. Block 206 compares the difference /Pn−LPn/ to the value previously stored in the speed/threshold RAM as dVMAX. If this new difference is greater than the current value of dVMAX, the new value is stored in the speed/threshold RAM as dVMAX. If the new value is less than the current value no change is made to dVMAX. dVMAX is used by software in the speed compensation algorithm.

BLOCK 208:

In block 208 the threshold value is updated in the first two steps indicated, and then the new threshold value is loaded into the X register for the comparison that occurs in block 215.

BLOCK 209, 210 and 211:

Blocks 209, 210 and 211 calculate the absolute difference between the current pixel, Pn, and the corresponding pixel from the last column, LCPn. This difference corresponds to the horizontal speed of the wand along the text and is used by software in the speed compensation algorithm.

BLOCK 212 and 213:

Block 212 compares the difference /Pn−LCP/ to the value previously stored in the speed/threshold RAM as dHMAX. If this new difference is greater than the current value of dHMAX, the new value is stored in the speed/threshold RAM as dHMAX. If the new value is less than the current value n change is made to dHMAX.

BLOCK 214:

In block 214 the current threshold value is stored in the X register for the comparison in block 215.

BLOCK 215, 216, and 217:

At this point, the last pixel, LPn, is compared to the sum of the current threshold value and a constant BETA. If PLn is greater than this sum, the signal, PIXEL, will be assigned a high logic level indicating that this PLn represented white. If LPn is less than the sum, the signal, PIXEL, will be assigned a low logic level indicating that this LPn represented black.

BLOCKS 218 and 219:

Blocks 218 and 219 update the variable HMAX. HMAX represents the largest Pn value detected over a column of pixels. Software uses this value to adjust the intensity of the lamps that illuminate the text that is being scanned by the wand.

BLOCK 220:

Block 220 stores the current pixel, Pn, in the speed/threshold ram so that it may be used in kHMAX calculation during the next column of pixels.

Speed Algorithms

The following algorithms are employed in speed determination.

---

Algorithm for determining dHPEAK
1. dHMAX must be greater than dHLIMIT.
2. Look at successive dHMAX values as read from the hardware. Keep saving the largest one until a dHMAX is read that is smaller than the largest found so far. When this condition is satisfied go to step 3.
3. The largest value of dHMAX found will now be called LOCALPK. Compare the LOCALPK to the dHMAX values.
   if LOCALPK < DHMAX
       go to step 2
   else
       if dHMAX < 75% of LOCALPK
   then dHPEAK = LOCALPK and dHLIMIT = LOCALPK
       else go to step 3

Algorithm for computing DC
1. If dHPEAK > dhavg
   then DC = 0 (this means a positive change of direction for dHAVG)
   else DC = 1 (this means a negative change in direction for dHAVG)

Algorithm for adjusting dHLIMIT
1. LD1 must be one
2. dHPKSUM = dHPKSUM + dHPEAK
3. If dHPKSUM > 123
   then decrement dHLIMIT and reset dHPKSUM to zero
   else do nothing Algorithm for adjusting dHAVG
1. LD1 must be one
2. If dHAVS < dHMAX and DC = 1
   then do nothing to dHAVG
   else if dHAVG < dHPEAK and DC = 1 or dHAVG > dHPEAK and DC = 0
   then do nothing to dHAVG
   else
       dhavg = 0.0033*dHAVG + dHAVG Algorithm for computing VVAL
1. If dVMAX > dVMAXLOW (where dVMAXLOW = 10)
   if the absolute value of (dVMAX − VVAL) > 1.5 * VVAL
   then VVAL = dVMAX/256 + 255 * VVAL/256
   else VVAL = dVMAX/16 + 15 * VVAL/16
   Else do nothing to VVAL Algorithm for computing LD1
1. dVSUM = dVSUM − dHAVG
   if dVSUM < = 0
   then LD1 = 1 and dVSUM = dVSUM + VVAL
   else LD1 = 0

Algorithm for adjusting the intensity of the lamps
1. If HMAX < k − 10
   then increase lamp intensity
   else if HMAX > k + 10
   then decrease the lamp intensity
   else do nothing to the lamp intensity
where k is a non-zero positive constant determined by the hardware.

---

The software employed in the speed/threshold circuit, controlling the operation of the microprocessor 107 of FIG. 1, in illustrated in the overall block diagram of FIG. 5, the steps of blocks A-E of FIG. 5 being illustrated in greater detail in the flow diagrams of FIG's 6-10 respectively. The blocks of these figures employ the above discussed nomenclature, and are hence believed to be self explanatory. A detailed discussion of these figures is hence not believed necessary herein.

Data Modification and Comparison System

FIG. 11 is a somewhat more detailed block diagram of the PreProcessing and comparison circuits of the invention. As illustrated in FIG. 11, the second microprocessor 111 is coupled to the image buffer 110 by way of a transceiver 123, the operation of the transceiver and the run length PAL 109 being controlled by outputs of a control PAL 124. The control PAL is synchronized with the timing signals of the system, as well as the control signals from the circuit of FIG. 3, to enable the selected passage of data from the run length PAL 109 to the image buffer, as well as the passage of the contents of the image buffer to and from the microprocessor 111 by way of the transceiver 123. The transceiver 123 thereby enables the program of the microprocessor 111 to effect modifications of the data stored in the image buffer 110, for example for shear correction, etc.

The character recognition algorithms require that the scanned data be in a defined format. Rather than storing all 128 pixels in each column, the addresses of transitions from white to black or black to white are stored. The information for each column is framed by an 8-bit code that cannot occur as a normal pixel transition. The data for a column consists of an undetermined number of bytes ending with an 8-bit code that identifies the end of a column. The undetermined number of bytes preceding the end of column byte identify where black to white and white to black transitions occur within the column. Each of these bytes represent the beginning address or ending address of strings of like pixels. Another "illegal" code identifies the end of a scan (line). The task of creating the run length codes is preferably accomplished in hardware to increase the speed and storage efficiency of the system. The LSM PAL asserts a signal, "Load RL", whenever (1) a pixel transition occurs, (2) end of column occurs or (3) when the end of scan is detected. The assertion of "Load RL" latches either the address/pixel data in the run length PAL or the appropriate 8-bit code identifying end of column or end of scan. The run length data is then written to the image buffer.

In FIG. 11 it is to be noted that the program memory 125 of microprocessor 111, as well as the data base 121 of microprocessor 120 are RAM's. It has been found preferable that these memories be temporary memories that are loaded with the desired program and data in an initialization procedure, in order to enable modification of the programs and data base in accordance with the desired results. The output on lines 128 of the microprocessor 120 may be directed, in part, to the microprocessor 111, as control functions, as needed.

Modification of Character Data

The character code and RAM after correction for speed and threshold level adjustments, is then subject to further adjustments in order to compensate for various effects and derive data in a "standardized" format, so that it can be compared with prestored data corresponding to one or more fonts. The term "standardizing", as used herein, refers to the modification of signals by the performing of predetermined so that the signals correspond to a saw modified character. (The "modified" character may not necessarily be "recognizable" as such in the sense of having an appearance similar to that of the actual character.)

An initial correction is provided for "shear" of the sensed character. The "shear" effect occurs if the operator does not pass the wand absolutely straight along a line of text. Any of text creates distortion of the sensed character, i.e. the data corresponding to the character as a modified form that may be sufficiently different from the "known" character as stored in the data base that it will not be recognized.

In order to compensate for the effect of shear, the run length data stored in image buffer 110 is subject to modification as illustrated in the flow chart of FIG. 11, under the control of microprocessor 111. As illustrated in FIG. 12, at block 500, the data, corrected for speed and threshold level (by hardware prior to this point), is retrieved from image buffer 110 by way of transceiver 123, under the control of the program of microprocessor of 111. The microprocessor develops plural representations of the retrieved data corresponding to the character, but with different shear distortions at block 501. In other words, the retrieved character data is distorted to provide software representations with a plurality (e.g. five) of different degrees of vertical shifts between columns both upwardly and downwardly in the vertical direction of the character. As illustrated at block 502, these variously shifted representations are then tested in accordance with a number of logical rules that show which of the representations of the character is its correct form without shear. For example, FIG. 13 illustrates the symbol +. In one test, a horizontal histogram is made of this character, as illustrated in FIG. 14. The horizontal histogram is a graph of the absolute density of the character along horizontal lines, starting from the bottom of the character upwardly. Thus, the histogram of the symbol +shows low density except at the central region, of the cross bar, wherein a peak is produced. FIG. 15 illustrates the character +with vertical shear distortion caused by a slight downward movement of the wand as it traversed the text line being scanned. The horizontal histogram of the +at FIG. 15, as illustrated in FIG. 16, does not have a peak as great as that of the correct figure, as shown in FIG. 14. Accordingly, one rule that may be employed for testing the various representations of the data, is that a representation having the highest peak is the correct representation. This follows from the fact that, in many fonts, horizontal lines, producing the greatest peaks in the horizontal histogram, are more prevalent than slanted lines. Further, tests of this type are also made in order to insure that the selected representation of the character most nearly represents a character without vertical shear.

Character Separation

In order to enable the identification of a character, it is necessary to initially separate or isolate the different sensed characters. This can prove difficult where overlap between the characters exists. For this purpose, it is necessary to process the data in order to determine which sensed elements correspond to a common character. For this purpose, an analysis is initially made in accordance with the invention of the horizontal runs, i.e., the coincidence of 1's in adjacent columns, and the merging of horizontal runs with vertical runs, i.e., character information or 1's in adjacent elements of a common column as generated in hardware. The merging of the runs without separation provides an indication that the runs are all parts of a common character. In some instances, however, separations occur that isolate various parts of a common character, either by error or intent or a specific font. Vertical overlap of various runs, i.e., vertical alignment thereof, generally indicates that the overlapped portions are parts of a common character. An exception can be made, however, with respect to characters that may overlap in normal text, for example the descenders of some lower case characters such as lower case y. In order to separate or isolate characters in this instance, upon the detection of a vertical overlap it is necessary to further analyze the runs of the character or characters, to determine if the specific nature of the overlapped runs of the unknown character follows generally the format that can be expected in the case of such specific characters. The isolation of characters may hence require the application of specific rules with respect to such characters. Thus, after the various horizontal runs have been defined, as well as the column by column data, tests may be made of the average distance between characters that have been previously isolated, in order to predict an actual isolation of characters even though they may appear to be interconnected. In addition, the average width of characters that have been isolated, for example in a run of 5 characters more or less, may be employed in order to resolve questionable horizontal character separations. If a one column break appears at the location at which a break between characters can be expected, then it may be considered to constitute the separation line of characters. Similarly, if a break appears in the expected location of a character, an assumption may be made that the break does not constitute a character separation. If a break between detected elements is too large, then a space between characters may be indicated. If the detected character is substantially larger than average, then the character may be in fact two characters. The testing of characters for separation thus constitutes, in accordance with the invention, the conversion of the sensed elements to a table of runs, or continuations of sensed data in common rows or columns, the classifying of the runs, the building of the characters therefrom and the isolation of the characters on the basis of the analysis of the built characters, in accordance with a determined set of rules. The rules constitute, for example, as above discussed, the analysis with respect to average width, average separation, vertical separation, special characters, etc.

This procedure is effected in software.

| Preferred Character Separation Method DEFINITIONS | |
| --- | --- |
| Vertical run: | A vertical run is a continuous string of 'on' pixels in a column of the Bit Image Character. For example, column 0 has one vertical run which starts at pixel 0 and ends at pixel 19, while column 4 has two vertical runs - one from 0 to 3 and the other from 16 to 19. This is generated in hardware. |
| Run length buffer: | Each pair of integers in the run length buffer describe one vertical run in the bit image buffer. This pair of numbers is the start and end of that vertical run. |
| Horizontal run: | A horizontal run is a continuous string (in the horizontal direction) of vertical runs. That is, if a vertical run from column i overlaps a vertical run from column i+1, then both vertical runs are pieces of the same horizontal run. An example of overlapping vertical runs would be a run starting at pixel 0 and ending at pixel 5 and the other vertical run starting at 3 and ending at 15. |
| Character: | A group of one or more horizontal runs. In the process of separating an X for example, it will start out as two 'characters' - the top and the bottom arms on the left side. When the middle of the X is reached, these two arms merge into one piece and, accordingly, the two characters started with (the arms) will be added to form one character, now made up of two horizontal runs. |

The steps of the preferred character separation algorithm are as

I. Compare the vertical runs in the current column with the vertical runs in the previous column.
   A. If there are vertical runs that overlap, continue building the appropriate horizontal run.
   B. If there is a vertical run in the current column that does not overlap any in the previous column, then start a new run and a new character.
   C. If there is a vertical run in the previous column that does not overlap any in the current column, then end the appropriate horizontal run.
      Note: If all of the other horizontal runs that are part of the character to which the ended horizontal run belongs are also ended, then a character has successfully been separated.
   D. If there are two or more vertical runs in the current column that overlap a single vertical run in the previous column, then a new horizontal run is started for each but not a new character. All of the new splitting horizontal runs belong to the same character.
   E. If there are two or more vertical runs in the previous column that overlap a single vertical run in the current column, then the appropriate horizontal runs are ended and added to character of the first horizontal run in the group of 'merging' horizontal runs.

II. If a character has not yet been separated (see note above), then go to I.

III. Create a new run length image of just the separated character in a separate character buffer.

This method is illustrated in FIG. 17.

An example of character separation is illustrated in FIGS. 18, 19 and 205. FIG. 18 illustrates a hypothetical character in the form of a hollow square. FIG. 19 illustrates the bit image representation of the character, with dots appearing at positions in the columns and rows of the character. The given character has 0 to 19 rows and 0 to 21 columns. FIG. 20 illustrates the buildup of runs on the basis of analysis of the PIXELS of the character of FIG. 19. Thus, in column 0, as well as columns 2-4, a vertical run exists from row 0 to row 19, it being evident that these runs are all horizontally overlapped. In the fifth column a vertical run exists between rows 0 and 3, as well as between rows 16 and 19, each of these vertical runs overlapping the vertical run of column 4. Consequently, the analysis continues with the building of vertical runs 0 to 3 and 16 to 19, through column 17, the two vertical runs in each column maintaining an overlapping relationship with the previous column. Since a vertical run of 0 to 19 is detected in column 19, it is apparent that this run is also a part of the same character, since it horizontally overlaps the two runs of column 17. The following three columns also detect vertical runs of 0 to 19 that overlap in the horizontal direction. Since no vertical run is found in the next column, it is apparent that a separation has occurred, with all of the previous runs corresponding to one and the same character.

Line Tracking

In addition, it is generally necessary to make an adjustment for line tracking, i.e., the uniformity of movement of the wand in the horizontal direction along the lines of text being scanned. Thus, while the above discussed shear correction provides a compensation for shear distortion that may occur in a given character, it does not serve to compensate for relative vertical displacement between adjacent characters.

Line tracking may be effected by testing the characters on the basis of further predetermined rules. For example, with respect to most characters, in view of further modification of the character data that will be employed later, it is adequate to ascertain the lowest row of the character, adjust that row to be aligned with the lowest row of the preceding character of group of characters. Further tests may be necessary to determine the line position with respect to some specific characters, such as hyphens, as opposed to underlining. This distinction may be effected by further testing characters of determined characteristics, such as dashes, to align the character on the basis of the alignment of preceding and succeeding characters. Further tests may also be made where necessary.

Skew Correction

In the scanning of a line with the wand, the longitudinal direction of the row of elements of the sensor may not be perpendicular to the longitudinal direction of the row of characters. This results in a skew of the sensed character. The sensed character may thus have relative horizontal displacement of the various portions of the character as a function of the angle between the longitudinal row of sensor and the normal to the longitudinal direction of the row of characters being sensed.

In accordance with the invention, as illustrated in FIG. 21, the sensed character data, after being reformatted to compensate for shear distortion as above discussed, is adjusted to correspond to a character having a constant height, for example, 32 elements or pixels high. The purpose of this adjustment, as well as the further adjustments that will be subsequently discussed, is not to provide a character or data corresponding to a character that would be visually correct, but, to enable the development of unique patterns that define a character independent of distortions and therefore can enable the identification of an unknown character. The character modification for shear, and height adjustment, as above discussed, as well as the further adjustments to be later discussed, are not employed in fact to reconstitute a character, the modification having been effected only in the software. For example, the adjustment of a character to have a constant height is effected by the replicating of predetermined numbers of adjacent rows, or deleting rows until the top element of the character is at a height of 32, and the lowest elements of the character, as represented in software, has a height of 1, assuming the horizontal rows of a character are numbered from bottom to top. This procedure will be more readily understood when it is apparent that a period, after software modification, will have a diameter extending from the bottom to the top of the character space.

After the vertical adjustment of the character to have a constant height, the centers of mass of the upper and lower halves of the character are determined, as illustrated in block 511. This step employs well-known equations for the determination of centers of mass (in two dimensions) of figures, with the "1's" in the uppermost half of the horizontal rows representing the character being separately considered from the "1's" of the lower half of the horizontal lines representing the character.

Based upon the calculation of the two centers of mass (or area), the top and bottom groups of rows are realigned horizontally in software so that the center of the mass of the top half is vertically aligned with the center mass of the lower half, as illustrated in block 512. The vertical alignment of the centers of mass is accompanied by the proportionate shifting of all rows in accordance with the adjustment that has been made to the centers of mass. Stated in another way, assume that a character to be represented had a line that extended from the top margin to the bottom margin of the character through the two centers of mass. After the realignment of the centers of mass to vertical with respect to one another, the "skew" direction would result in data corresponding to a character wherein the rows of the character are readjusted so that the data thereof represents a character wherein such row of the character is a vertical line that still passes through the two centers of mass. It will thus be apparent that the skew adjustment effects a horizontal shifting of the rows that increases linearly from the vertical center of the character.

Following this skew correction, as illustrated in block 513 the character is now adjusted to have a constant width, preferably 32 elements or pixels. This adjustment is effected in the same manner as the height adjustment as above discussed, so that the left and right sides of the depicted character abut the sides of the 32 by 32 element matrix that now defines the character. Thus, columns may be added or deleted from the represented character to expand or narrow the character to just fit within these bounds. The fact that this is effected in software only, and does not constitute a modification that enhances any visual characteristics of a character, is evident when it is apparent that a period, expanded in the vertical and horizontal directions, will be characterized by data corresponding to a solid circle having a diameter of 32 elements. While the skew correction may be effected by the program of the microcomputer 111, it is preferably effected using microprocessor 120.

Generation of Identification Vectors

Owing to the large size of the stored data base, corresponding to over 1000 characters, it is apparent that a complete comparison between all characters stored in the data base and the unknown character, employing the 32 by 32 element matrix is exceedingly time consuming, and would result in a character recognition device that may not be practical for many purposes. In order to speed the comparison process, a vector is developed based upon the 32 by 32 element matrix for the unknown and data base characters, i.e. the feature vector.

In order to develop the feature vector, the 32 by 32 element matrix is effectively initially separated into an 8 by 8 block grid, each cell thereof having 4 by 4 pixels. Thus, each cell may have a pixel count from 0 to 16, depending upon the number of 1's in the corresponding cell. In order to simplify the definition of the featured vector, to enable each word thereof to be described in four bits, each word of the feature vector corresponds to the number of 1's in the corresponding cell, with the 15th and 16th 1's producing the same number. The feature vector thus is a series of 8 by 8 or 64 words, each word being 4 bits and representing the number of 1's in the corresponding cell.

There are two main and distinctive stages in the recognition process when an unknown character in its feature vector form is passed from the previous section of the system. The first process involves reducing the number of possible characters that the unknown character may be, into a small and manageable subset of the data base. The second process involves analyzing this subset of the data base and zeroing in on the identity of the character corresponding to the unknown feature vector.

The first process, that of creating a subset is accomplished by measuring the Euclidean distance between a data compressed vector derived from the unknown feature vector and each of the data compressed vectors associated with the feature vectors in the data base.

The use of the feature vector itself in a comparison process of all characters in the data base would require an undesirably long searching process. In accordance with the invention, the 64 element feature vector is mathematically compressed into a 6 element vector.

This is the first of two main recognition stages. It has been found that the derivation and use of these 6 element compressed vectors is adequate to enable final character recognition with greater than or equal to 70% accuracy. Then, using a second recognition stage (bit masks, to be explained in detail later) recognition accuracy is increased to the desired level.

The use of a larger compressed feature vector containing possibly 7 or 8 elements might increase the recognition rate at this stage, but it would also increase the amount of time spent in measuring distances. Thus a balance must be struck between the number of elements in the compressed feature vector and the efficiency of the second recognition stage (using bit masks).

Depending on the particular implementation of this invention, more or less elements maybe used in the compressed feature vector during this stage of recognition, depending upon accuracy and execution speed requirements.

Generation of Compressed Vectors in the Data Base

The following procedure is part of the initial construction of the data base and does not occur in real time.

One embodiment of the data base is a matrix with as many rows as characters and 64 columns (containing for each character the contents of its feature vector).

Each of these columns can be considered as a variable and has associated with it a mean and a variance. These quantifies are calculated and then stored in the data base. The correlation between every pair of above mentioned variables (for each character) is computed and the results are organized into a symmetric matrix, with 64 rows corresponding to the 64 variables and 64 columns corresponding to the same 64 variables. At the intersection of any row i and the column j can be found the considered as a matrix of cross correlations.

The next step is in mathematical terms to uniquely diagonally this matrix. This is accomplished by Eigen vector, Eigen value decomposition resulting in 64 Eigen values and their 64 associated Eigen vectors. The 64 Eigen values are ranked by magnitude, and the Eigen vectors corresponding to the 6 largest Eigen values are selected.

These 6 Eigen vectors (column vectors) make up what is hereafter referred to as the transformation matrix. In mathematical terms this transformation matrix spans a sub space which captures a sufficient amount of information concerning the data base to proceed without any substantial information loss at this stage.

In accordance with one embodiment of the invention the process for compressing a 64 element feature vector into a 6 element vector is as follows:

The 64 element feature vector is post multiplied by the transformation matrix. Since, as discussed above, the transformation matrix is 64 by 6, the multiplication results in a 1 by 6 matrix (or vector) for each feature vector.

This post multiplication of the feature vector by the transformation matrix is equivalent mathematically to projecting a 64 element vector into a 6 dimensional space in order to effect data compression.

The 6 elements of this compressed vector shall be referred to as the 6 Eigen scores.

Each character or feature vector in the data base is standardized as previously discussed and then projected into this 6 dimensional space. The standardization process ensures that each dimension of the 64 dimensional space spanned by the 64 element feature vectors comprising the data base has a mean of zero and a variance of 1.

Now each character or feature vector in the data base thus has associated with it a 6 element vector containing Eigen scores.

In other words, all of the characters or feature vectors in the 64 dimensional data base space have been projected into a 6 dimensional space.

It is into this space that unknown feature vectors or characters need to be projected, and then compared with the compressed feature vectors in the data base.

When an unknown character or feature vector is passed to OCR or the optical character recognition process part of the program the following occurs:

The unknown character or feature vector is standardized on an element by element or variable by variable basis using the previously computed and stored statistics of the corresponding element (1 out of 64) in the data base.

The unknown character or 64 element feature vector is projected into the 6 dimensional space by post multiplying it by the above mentioned transformation matrix.

The resulting compressed 6 element vectors containing Eigen scores are compared with the previously generated 6 element vectors containing Eigen scores for each character in the data base and only characters having a predetermined closeness or Eucidian distance to the unknown are considered in the second process.

The data compression is effective both with respect to the unknown, as well as to the characters of the fonts stored in the data base. By employing comparisons on the basis of six Eigen scores, it has been found that about 70% of the information available concerning the identity of the character is represented in the Eigen scores, to thereby enable a relatively accurate comparison of the known characters in the data base and unknown characters in a minimum time. In the comparison of the six Eigen scores of the known characters and the unknown character, a simple Euclidian distance measurement is employed with respect to the six Eigen scores of each character to result in a measure of the degree of similarity between the unknown character and the characters represented in the data base. Once this has been effected, the resulting distances (which are the measures of similarity) are subjected to a thresholding function based on the smallest of two values. The first of the threshold values is an absolute distance which has been predetermined, for example, 4.5. When the distance between the scanned unknown character and a character from the stored data base is greater than 4.5, then there will be no need to further consider this particular stored character as a possible candidate for further comparisons. The second threshold is a distance based upon the closest distance measured of all the characters in the average data base times a constant (for example, 5). This second threshold is effective in order to eliminate further characters from the data base that are not really of interest. For example, if the distance measured for many of the characters in the data base is just below the first absolute threshold, but the distance to the closest character is quite small, for example, 0.2 (resulting in a second threshold of $1.0 = 0.2 \times 5$) it is apparent that no further consideration need be given to characters whose difference is greater than the second threshold.

In a data base of 16 fonts, each font having 80 characters, it has been found that the comparison of 6 Eigen scores of the unknown with 6 Eigen scores of each character in the data base results in the production of, on the average, 25 characters that have adequate correlation to be further considered. At the most, it has been found that 130 characters may be so selected for further consideration. When a single font of 80 characters has been compared by this technique, it has been found that the number of characters of sufficiently high correlation is reduced to about 5 characters on the average. Accordingly, the initial comparison on the basis of 6 Eigen scores reduces the number of characters that must be considered in detail to a substantial extent.

Since differentiation of characters based on only 6 of a possible 64 Eigen scores does not convey all the significant information in the distinguishing of characters, it has been found preferable to select for each character in the data base determined words that most clearly define the character and distinguish it from other characters. Thus, the data base has a bit mask for each of the characters, indicating the most variable parts thereof. The specific words indicated by the bit mask for each character are compared with the same words in the unknown character, employing a simple Euclidian difference to further eliminate characters that are not the same as the index vectors of unknown. The comparison of the bit masks is effected for all characters that have been selected or flagged during the comparison with the 6 Eigen scores.

This latter comparison will result in one character whose distance is closer to the unknown than all others and selection of this character as a match to the unknown results in substantially positive identification of the great majority of characters, leaving only a few uncertainties between characters that are exceedingly similar, such as the numeral 1 and lower case l, capital and lower case O, and zero (in some fonts), etc.

Further tests may be effected with respect to such similar characters, such as the provision of more specific bit masks, and identification of a character on the basis of its use in the text (contextual differentiation) or on the basis of expected versus actual scanned height. Thus, if a character is found in a number or letter respectively.

Hard Wired Input Circuit

FIG. 23 shows a more detailed circuit of the hard wired circuit for receiving and providing the initial processing of the signals from the wand. The serial analog signals are applied to analog to digital converter 103, the 8 bit parallel output being applied to an octal D type flipflop 101 serving as the Pn register. The A/D convertor may be of the type AM 6148 manufactured by AMD. The analog to digital conversion and the storage of each pixel in the flip flop 101 is effected under the control of the clock signals derived from the Master State Machine and control signals from the PAL circuit 151.

The flipflop 1101 thus continually stores a digital signal corresponding to the amplitude of the currently pixel from the wand. This value, Pn, is directed to arithmetic logic chips 1102, 1103 for the derivation of the X, REM and REM/16 values to be stored in the flipflop registers 1104, 1105 and 1106. Under hardware control the Pn value is eventually transferred to the flipflop register 1107 prior to the receipt of the next pixel, so that the contents of the flipflop register 1107 corresponds to the last pixel scanned, the LPn signal. Under hardware control the Pn value stored in the register 1101 is also transferred to the RAM 1108, by way of the driver 1109, the RAM 1108 storing all of the pixels of the previous column scanned. The data stored in the RAM 1108 is also applied directly to the arithmetic logic unit 1102 (FIG. 23). In this arrangement the flipflop register may be of the type 74 ALS 374, the drivers of the type 74 ALS 244 and the arithmetic logic units of the type 74 F 381. The circuit of FIG. 23 enables the hardware calculation and storage of signals for determining the threshold for the pixels to be processed in the character recognition device of the invention, as well as for determining the speed of movement of the wand and intensity control. Basically, as discussed above, these two parameters are employed to determine if a pixel could be interpreted as black or white, as well as to provide compensation for the speed of movement of the wand. Speed compensation is effected by the selective omission of a column of pixel data when the wand speed in low, and the multiple consideration of columns of pixel data when the speed of movement of the wand is high, although this latter technique is not preferred.

MASTER STATE MACHINE

FIG. 24 illustrates the Master State Machine employed for controlling the hard wired circuit of FIG. 23. In this arrangement, the control signals for the registers of FIG. 23 are derived from 20R8B PALs 1201 and 1202 and the timing pulses are provided by an EP600 PAL 1203 controlled by clock 102 (FIG. 1), for example a 12 mHz clock. The THOM/TOS signal applied to terminal 2 of the MSM PAL is an identification signal derived from the wand. The PAL 203, which is programmed to provide suitable counters, also derives address control signals A0–A5, applied to the circuit of FIG. 23 by way of the 2 input selector driver 1204. The circuit of FIG. 24 further shows the microprocessor 1205, of the type 8051, corresponding to microprocessor 107 of FIG. 1, programmed to receive data from the speed/threshold RAM 1108 on a column by column basis, approximately every 200 microseconds. The 200 microsecond rate is determined in view of the 1.3 microsecond scanning of each element of the 128 elements CCD sensor in the one, and including the 30 "PAD" pixels. The program of the microprocessor insures compensation of the signals for speed of movement of the wand, and intensity of lamps in wand.

FIG. 25 illustrates the general organization of the arrangement of FIGS. 23 and 24. Thus, the block 1400 encompasses generally the hardware elements of FIG. 23 with the exception of the LPn RAM 1108, which is separately illustrated. The PAL logic of FIG. 24 is represented in FIG. 25 by the reference numeral 1401. This circuit controls the interrupt of the microprocessor 205 at its interrupt terminal by the signal /P7. The microprocessor 1205 interfaces with the RAM 1108, for receipt of the last column data, for later processing. The entire circuit is controlled by the clock applied to the PAL system 1401. This circuit shows a negated overflow output from the system 1400, which is applied to the PAL circuit 1401. The negated overflow signal is an overflow from the ALU's of the hard wired logic circuit.

The selector 1204 of FIG. 25 provides, in one phase the address signals A0–A5 for the hardware circuit of FIG. 23 as derived from the PAL 1203, whereas in another phase these address lines are all high as derived from a SEL-LCPn control signal, for addressing of the LCPn RAM at the desired times as controlled by the PAL circuitry.

FIGS. 26 and 27 are more detailed block diagrams of the RSM processor and image buffer of the RSM, illustrating in greater detail the various signals and controls in this portion of the circuit. The PAL (or SIPO) 109, which may be type 74LS595, receives the PIXEL signal serially, this signal as discussed above being a high low depending upon the amplitude of light detected at a given element of the CCD. The BLANK signal may be employed to clear the shift register in the PAD or blank period of scanning of the CCD. The shift register 109 is controlled by PAL 124, the clock of the shift register being a function of the speed input to this PAL, at terminal three, received from the speed microprocessor 1205. The PAL 124 also provides the control signals for the memories 110 and 112.

The dynamic RAMs 1502 store the program for the microprocessor 111, the program being stored in these RAMs upon initialization. The flipflop 1503 and selectors 1504 provide address selection for the program RAMs 1502. The data lines 1505 couple the microprocessor 111 to the transceiver 123, the address lines 1506 addressing the RAMs 110, 112 by way of buffer 1510.

The circuit of the microprocessor 111 is provided with a host controlled reset 1511. The PCPORT signals, derived from the output of the microprocessor 120, are coupled to the port 1 of microprocessor 111 as well as to an octal flip flop 1501, for control purposes.

The circuit of the microprocessor 120 is illustrated in greater detail in FIG. 27, wherein the memories 121, 122 are dynamic RAM memories addressed from the microprocessor by way of flipflop 1601 and selectors 1602 and 1603 in the conventional manner. The dynamic RAMs 121, 122 store the data base, as well as the program of the microprocessor 120, and also serve as a working memory.

FIG. 29 is a circuit diagram of an interface that may be employed between wand 100 (coupled to the VIDEO line of this figure) and the A/D converter 103 (coupled to receive the output ADCIN of this figure). In FIG. 29, the LAMP output is coupled to the lamp the wand, to control the intensity of illumination of the document as a function of the INTENSITY signal.

FIG. 30 illustrates an interface that may be employed between the system of the invention and a conventional microcomputer, such as an IBM PC or equivalent. The PC BUSS is the standard bus for the microcomputer, and the signal lines of the system are connected to the interface as indicated. The interface employs a PAL U51. Other components in this figure, as well as in the other figures as applicable employ standard designations for the various IC components, the prefix "74" being omitted on TTL devices for simplification. Similarly common signal lines employ the same designation in the various figures, for clarity of the disclosure.

The above disclosure of a preferred embodiment of the invention has been directed to a system employing a hand held optical reader for the recognition of alphanumeric data such as text or the like. It is of course apparent that the invention is not limited to either the provision of a hand held reader, nor the provision of an optical reader. The data handling system is thus adaptable, at least in part, to data signals received from other than hand held devices, and the data can be read by other sensing devices, such as but not limited to magnetic and electrical sensing devices, to produce the data input signals.

It is further apparent that the invention is also adaptable to the recognition of data in forms other th alphanumeric data. Thus the data recognition techniques of the invention are equally useful for the recognition of bar code data since data signals corresponding to bar codes or other known codes are subject to many of the recognition problems as signals corresponding directly to alphanumeric characters.

The invention is also readily adaptable to the recognition of graphic image data as well as patterns in on-line signals. For example electrocardiographs are comprised of repetitive line patterns which, in accordance with the invention, may be separated. The individual "cycles" thus constitute data containing images that may be modified to have standardized form and compared with standardized patterns stored in a data base. The system of the invention may thus be employed to enable the recognition of various conditions reflected in either the electrocardiograph of a patient or in the corresponding on-line data signals received from the patient. Similarly, the invention may also be employed to recognize patterns in recorded speech, as well as in any other data signals having patterns subject to standardization of signals and comparison with a data base. The concepts of the invention facilitate such recognition in view of the fact that it enables the ready comparison of data with an extremely large data base.

In view of adaptability of the invention to the recognition of data corresponding to other than that conventionally considered to constitute "characters", the term "pattern" as used herein shall be understood to be generic to and include "character" within its scope.

While the invention has been disclosed and described with reference to a limited number of embodiments, it is apparent that variations and modifications may be made therein, and it is therefor intended in the following claims to cover each such variation and ramification as falls within the true spirit and scope of the invention.

What is claimed is:

1. Apparatus for pattern recognition comprising:
   (a) means for scanning an unknown pattern to produce a first matrix of column and row signals representing the scanned image of the unknown pattern,
   (b) means for producing from the first matrix a reduced size standard matrix of constant height and width containing an image only of a single character of the pattern, said producing means comprising:
      (i) means for normalizing the height of the scanned image,
      (ii) means for correcting the scanned image for skew by dividing the matrix with normalized height image into top and bottom parts, determining the center of mass separately for each of the top and bottom parts, and horizontally shifting rows of the image until the mass centers are vertically aligned,
      (iii) means for normalizing the width of the horizontally shifted image by modifying the image by replicating and deleting vertical lines of the image until the image just fits within the standard matrix,
   (c) means for creating from the standard matrix with normalized height and width image a multiple-word feature vector characteristic of the image by subdividing the image into smaller units and generating a word characteristic of the image part in each smaller unit,
   (d) means for comparing the feature vector thus obtained or signals derived therefrom with corresponding signals obtained from known characters and stored in memory to assist in identifying a character of the unknown pattern.

2. A method of pattern recognition,, comprising the steps:
   (a) scanning the unknown pattern to produce a first matrix of column and row signals representing the scanned image of the unknown pattern,
   (c) producing from the first matrix a reduced size standard matrix of constant height and width containing an image only of a single character of the pattern by the following steps:
      (i) normalizing the height of the scanned image,
      (ii) dividing the matrix with image obtained in the previous step into top and bottom parts, determining the center of mass separately for each of the top and bottom parts, and horizontally shifting rows of the image until the mass centers are vertically aligned,
      (iii) normalizing the width of the shifted image obtained in the previous step by modifying the image with respect to the selected matrix by replicating and deleting vertical lines of the image until the image just fits within the standard matrix,
   (c) then from the standard matrix with image obtained following step (b), creating a multiple-word feature vector characteristic of the image by subdividing the image into smaller units and generating a cord characteristic of the image part in each smaller unit,
   (d) thereafter comparing the feature vector obtained in step (c) or signals derived therefrom with feature vectors or signals derived therefrom obtained from known characters and stored in memory to assist in identifying a character of the unknown pattern.

3. A method as set forth in claim 2 wherein step (c) is carried out by forming separate blocks each representing a separate one of said smaller units, each blocks containing different multiple rows and columns of the matrix.

* * * * *